(12) United States Patent
Lim et al.

(10) Patent No.: US 8,723,930 B2
(45) Date of Patent: May 13, 2014

(54) MOBILE TERMINAL AND METHOD OF CONTROLLING A THREE-DIMENSIONAL IMAGE THEREIN

(75) Inventors: Soojung Lim, Seoul (KR); Hakhae Kim, Seoul (KR); Kilseon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 13/021,643

(22) Filed: Feb. 4, 2011

(65) Prior Publication Data

US 2012/0028678 A1 Feb. 2, 2012

(30) Foreign Application Priority Data

Jul. 27, 2010 (KR) ........................ 10-2010-0072313

(51) Int. Cl.
*H04N 13/04* (2006.01)
*H04N 13/00* (2006.01)
*H04N 13/02* (2006.01)

(52) U.S. Cl.
USPC .................... 348/51; 348/42; 348/43; 348/47

(58) Field of Classification Search
CPC .......... H04N 13/0497; H04N 13/0404; H04N 13/0409

USPC ...................................................... 348/51, 47
See application file for complete search history.

(56) References Cited

U.S. PATENT DOCUMENTS

| | | | |
|---|---|---|---|
| 6,864,911 B1 * | 3/2005 | Zhang et al. | 348/42 |
| 7,324,749 B2 * | 1/2008 | Kubo | 396/429 |
| 8,111,247 B2 * | 2/2012 | Thorn | 345/173 |
| 2004/0207722 A1 * | 10/2004 | Koyama et al. | 348/14.02 |
| 2005/0285945 A1 * | 12/2005 | Usui et al. | 348/207.99 |
| 2007/0296809 A1 * | 12/2007 | Newbery | 348/42 |
| 2008/0158346 A1 * | 7/2008 | Okamoto et al. | 348/47 |
| 2009/0009592 A1 * | 1/2009 | Takata et al. | 348/47 |
| 2009/0160931 A1 * | 6/2009 | Pockett et al. | 348/42 |
| 2010/0111489 A1 * | 5/2010 | Presler | 386/52 |
| 2010/0225744 A1 * | 9/2010 | Tomizawa et al. | 348/47 |
| 2011/0018968 A1 * | 1/2011 | Shikata et al. | 348/47 |
| 2011/0119611 A1 * | 5/2011 | Ahn et al. | 715/769 |

\* cited by examiner

*Primary Examiner* — Joseph Ustaris
*Assistant Examiner* — Rebecca Volentine
(74) *Attorney, Agent, or Firm* — Lee, Hong, Degerman, Kang & Waimey

(57) ABSTRACT

A mobile terminal includes a display including a touchscreen, a plurality of cameras including a first camera and a second camera capturing a left eye image and a right eye image, respectively, to generate a three-dimensional (3D) image, and a controller for generating a 3D preview image to which at least one parameter value for one of the first camera and the second camera is set, and for displaying the generated 3D preview image on a screen of the display.

25 Claims, 23 Drawing Sheets

Left eye

Right eye (a)

(b)

(a)

(b)

(c)

MOBILE TERMINAL AND METHOD OF CONTROLLING A THREE-DIMENSIONAL IMAGE THEREIN

CROSS REFERENCE TO RELATED APPLICATIONS

Pursuant to 35 U.S.C. §119(a), this application claims the benefit of earlier filing date and right of priority to Korean Application No. 10-2010-0072313, filed on Jul. 27, 2010, the contents of which are hereby incorporated by reference herein in their entirety.

FIELD OF THE INVENTION

The present invention relates to a mobile terminal, and more particularly, to a mobile terminal and a three-dimensional (3D) image controlling method therein.

DISCUSSION OF THE RELATED ART

A mobile terminal is a device which may be configured to perform various functions. Examples of such functions include data and voice communications, capturing still and moving images via a camera, recording audio, playing music files and outputting music via a speaker system, and displaying images on a display. Some terminals include additional functionality which supports game playing, while other terminals are also configured as multimedia players. More recently, mobile terminals have been configured to receive broadcast and multicast signals which permit viewing of contents such as videos and television programs.

Generally, terminals can be classified into mobile terminals and stationary terminals according to a presence or non-presence of mobility. And, the mobile terminals can be further classified into handheld terminals and vehicle mounted terminals according to their mode of carriage.

There are ongoing efforts to support and increase the functionality of mobile terminals. Such efforts include software and hardware improvements, as well as changes and improvements in the structural components which form the mobile terminal.

Recently, three-dimensional (3D) visualization has been implemented on a display unit of a terminal as demands for providing various functions using the 3D image are continuously increasing. In particular, a plurality of cameras for photographing left and right eye images are provided to a mobile terminal. And, a 3D image can be generated using the left and right eye images received via the cameras.

SUMMARY OF THE INVENTION

Accordingly, the present invention is directed to a mobile terminal and three-dimensional (3D) image controlling method therein that substantially obviate one or more problems due to limitations and disadvantages of the related art.

An object of the present invention is to provide a mobile terminal and 3D image controlling method therein, by which illumination intensity can be more precisely represented in a 3D image by setting different dynamic ranges of a plurality of cameras including at least a first camera and a second camera for 3D photographing.

Another object of the present invention is to provide a mobile terminal and 3D image controlling method therein, by which generation time of a 3D image can be reduced by applying only a parameter value set for a prescribed one of a plurality of cameras to the 3D image in the process of generating the 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an embodiment of present invention, a mobile terminal includes a display having a touchscreen, a plurality of cameras capturing a left eye image and a right eye image used for generating a three-dimensional (3D) image, the plurality of cameras including a first camera and a second camera capturing the left and right eye images, respectively, and a controller. The controller generates a 3D preview image to which at least one parameter value for one of the first camera and the second camera is set, and displays the generated 3D preview image on a screen of the display.

According to another embodiment of the present invention, a method of controlling a three-dimensional (3D) image in a mobile terminal includes receiving a left eye image and a right eye image via a plurality of cameras of the mobile terminal to generate the 3D image, the plurality of cameras including a first camera and a second camera, recognizing at least one parameter value set for one of the first camera and the second camera, generating a 3D preview image having the recognized at least one parameter value applied thereto, and displaying the generated 3D preview image on a display of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIGS. 13(a)-15(d) are diagrams illustrating screen configurations for a process for indicating a camera corresponding to a parameter value applied to a 3D preview image according to still another embodiment of the present invention.

FIGS. 16(a)-18(d) are diagrams illustrating screen configurations for a process for indicating a camera corresponding to a parameter value not applied to a 3D preview image according to yet still another embodiment of the present invention.

FIGS. 20(a)-21(d) are diagrams illustrating screen configurations for a process for selectively applying a parameter value of a camera, which is not applied within a preview image, to an object in the 3D preview image only according to yet still another embodiment of the present invention.

FIGS. 22(a)-23(c) are diagrams illustrating a process for partitioning a screen of a touchscreen into a first region and a second region and then displaying a 3D image having different parameter values of first and second cameras applied thereto on the first region and the second region, respectively, according to yet still another embodiment of the present invention.

DESCRIPTION OF VARIOUS EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals as well as stationary terminals, such as mobile phones, user equipments, smart phones, digital televisions (DTVs), computers, digital broadcast terminals, personal digital assistants, portable multimedia players (PMPs) and navigators. However, by way of non-limiting example only, further description will be with regard to a mobile terminal 100, and it should be noted that such teachings may apply equally to other types of terminals.

Figure 1:
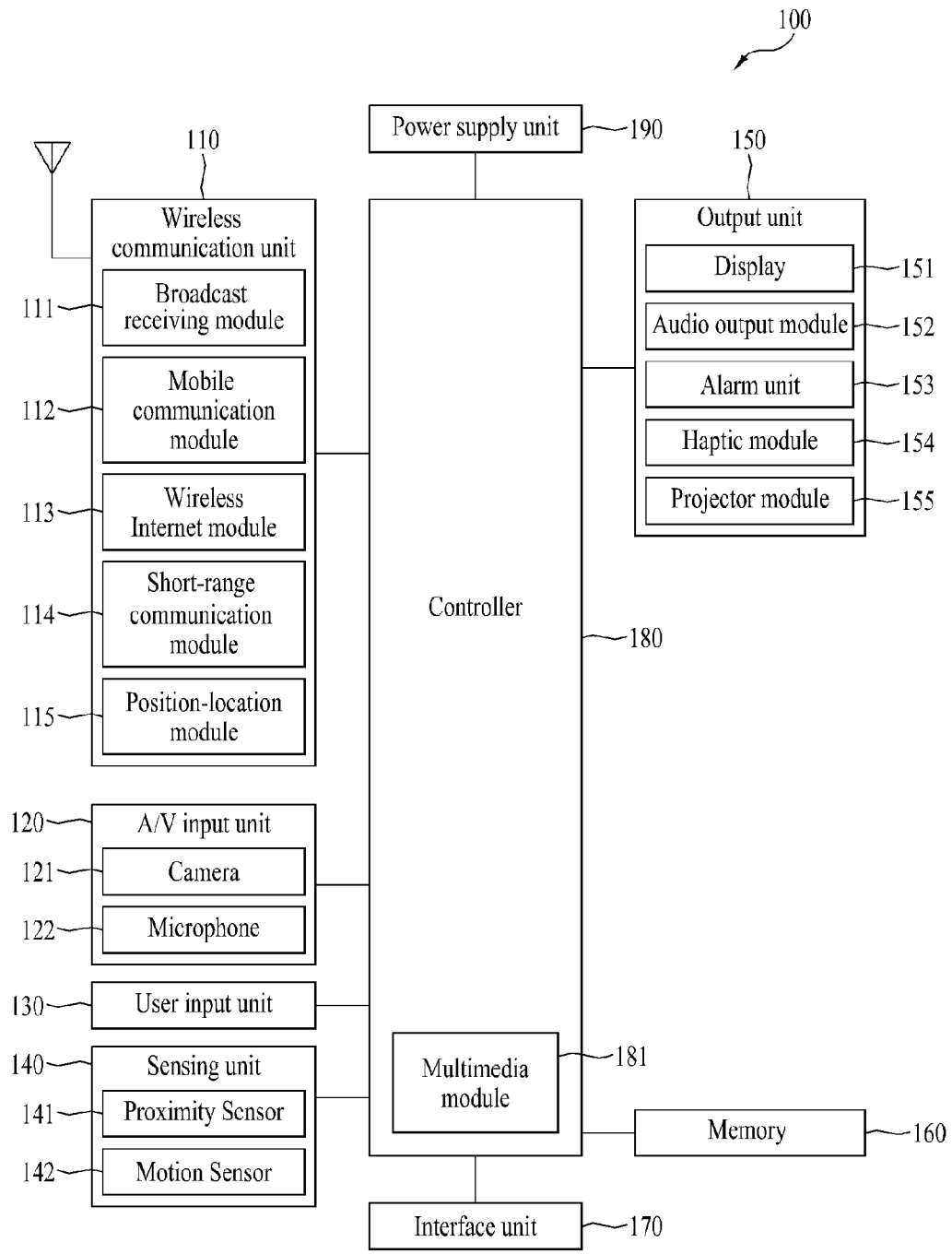
FIG. 1 is a block diagram of a mobile terminal according to one embodiment of the present invention.

FIG. 1 is a block diagram of a mobile terminal 100 in accordance with an embodiment of the present invention. Referring to FIG. 1, the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence. The wireless communication unit 110 typically includes one or more components which permit wireless communication between the mobile terminal 100 and a wireless communication system or network within which the mobile terminal 100 is located. For instance, the wireless communication unit 110 may include a broadcast receiving module 111, a mobile communication module 112, a wireless Internet module 113, a short-range communication module 114, a position-location module 115 and the like, as shown in FIG. 1.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 may be provided to the mobile terminal 100 to facilitate simultaneous reception of at least two broadcast channels or broadcast channel switching. The broadcast associated information includes information associated with a broadcast channel, a broadcast program, a broadcast service provider, and the like. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of a digital multimedia broadcasting (DMB) system and an electronic service guide (ESG) of a digital video broadcast-handheld (DVB-H) system.

The broadcast receiving module 111 may be configured to receive broadcast signals transmitted from various types of broadcast systems. By nonlimiting example, such broadcasting systems include a digital multimedia broadcasting-terrestrial (DMB-T) system, a digital multimedia broadcasting-satellite (DMB-S) system, a digital video broadcast-handheld (DVB-H) system, a DVB-CBMS system, an OMA-BCAST system, the data broadcasting system known as media forward link only (MediaFLO®) and an integrated services digital broadcast-terrestrial (ISDB-T) system. Optionally, the broadcast receiving module 111 can be configured for other broadcasting systems in addition to the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, and the like). Such wireless signals may represent audio, video, and data according to text/multimedia message transmissions/receptions, among others.

The wireless Internet module 113 supports Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth® and ZigBee®, to name a few.

The position-location module 115 identifies or otherwise obtains the location of the mobile terminal 100. If desired, this module may be implemented with a global positioning system (GPS) module.

Further referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses digital zoom and processes image frames of still pictures or video, which may be obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 may be provided to the mobile terminal 100.

For instance, the camera 121 may include a first camera 121a and a second camera 121b (see FIG. 2B) provided for 3D image photographing on a surface opposite a surface on which the display 151 of the mobile terminal 100 is located. A third camera 121c for allowing a user to self-photograph himself may be provided on a prescribed region of the surface provided with the display 151 of the mobile terminal 100. In this case, the first camera 121a is provided for photographing a left eye image as a source image of a 3D image, while the second camera 121b is provided for photographing a right eye image as a source image of the 3D image, for example.

The microphone 122 receives an external audio signal while the mobile terminal 100 is in a particular mode, such as phone call mode, a recording mode and a voice recognition mode. The audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal 100. For instance, the sensing unit 140 may detect an open/closed status of the mobile terminal 100, relative positioning of components (e.g., a display 151 and keypad) of the mobile terminal 100, a change of a position of the mobile terminal 100 or a component of the mobile terminal 100, presence or absence of user contact with the mobile terminal 100, and/or orientation or acceleration/deceleration of the mobile terminal 100.

As an example, if the mobile terminal 100 is configured as a slide-type mobile terminal, the sensing unit 140 may sense whether a sliding portion of the mobile terminal 100 is open or closed. Other examples include the sensing unit 140 sensing the presence or absence of power provided by the power supply unit 190, the presence or absence of a coupling or other connection between the interface unit 170 and an external device. And, the sensing unit 140 may include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal 100 is operating in a phone call mode, the display 151 will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optically transmissive type of display, which can be referred to as a transparent display. A representative example of the transparent display includes a TOLED (transparent OLED) or the like. A rear configuration of the display 151 may be implemented as an optically transmissive type as well. In this configuration, a user is able to see an object behind a terminal body via the area occupied by the display 151 of the terminal body.

At least two displays 151 may be provided to the mobile terminal 100 in accordance with the implemented configuration of the mobile terminal 100. For instance, a plurality of displays 151 can be arranged on a single face of the mobile terminal 100 in a manner of being spaced apart from each other, or built as one body. Alternatively, a plurality of displays 151 can be arranged on different faces of the mobile terminal 100.

If the display 151 and a sensor for detecting a touch action (hereinafter called 'touch sensor') is configured as a mutual layer structure (hereinafter called 'touchscreen'), the display 151 may be used as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 into an electric input signal. Moreover, the touch sensor may be configured to detect a pressure of a touch as well as a touched position or size.

If a touch input is received via the touch sensor, signal(s) corresponding to the touch input are transferred to a touch controller. The touch controller processes the signal(s) and transfers the processed signal(s) to the controller 180. Therefore, the controller 180 is able to notice whether a prescribed portion of the display 151 is touched.

Further referring to FIG. 1, the proximity sensor 140 can be provided to an internal area of the mobile terminal 100 enclosed by the touchscreen or around the touchscreen. The proximity sensor 140 detects a presence or non-presence of an object approaching a prescribed detecting surface or an object existing around the proximity sensor 140 using an electromagnetic field strength or infrared ray without mechanical contact. Hence, the proximity sensor 140 may be more durable and versatile than a contact type sensor.

The proximity sensor 140 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, the proximity of a pointer is detected via a variation of an electric field according to the proximity of the pointer. Here, the touchscreen (touch sensor) can be classified as the proximity sensor 140.

In the following description, for clarity, a pointer approaching without contacting the touchscreen, but recognized as located on the touchscreen is referred to as a 'proximity touch'. And, a pointer actually touching the touchscreen is referred to as a 'contact touch'. A position on the touchscreen proximity-touched by the pointer refers to a position of the pointer vertically opposing the touchscreen when the pointer performs the proximity touch.

The proximity sensor 140 detects a proximity touch and a proximity touch pattern such as a proximity touch distance, a proximity touch duration, a proximity touch position, a proximity touch shift state, and the like. And, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function such as a call received, a message received, and the like. The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output module 152. Hence, the display 151 or the audio output module 152 can also be regarded as part of the alarm unit 153.

The haptic module 154 generates various tactile effects that can be sensed by a user. Vibration is representative of one of the tactile effects generated by the haptic module 154. Strength and pattern of the vibration generated by the haptic module 154 are controllable. For instance, different vibrations can be output in a manner of being synthesized together or can be output in sequence.

The haptic module 154 may generate other various tactile effects in addition to vibration. For instance, the haptic module 154 may generate an effect attributed to the arrangement of pins vertically moving against a contact skin surface, an effect attributed to an injection/suction power of air though an injection/suction hole, an effect attributed to a skin over a skin surface, an effect attributed to contact with an electrode, an effect attributed to an electrostatic force, an effect attributed to the representation of a hot/cold sense using an endothermic or exothermic device, and the like.

The haptic module 154 can be implemented to enable a user to sense the tactile effect through a muscle sense of a finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 performs an image projector function using the mobile terminal 100. The projector module 155 may display an image, which is identical to or at least partially different from an image displayed on the display 151. The projector module 155 may display an image on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. And, the projector module 155 can further include a device for adjusting a direction of the projected image by mechanically moving the lens or the entire module.

The projector module 155 may be a CRT (cathode ray tube) module, an LCD (liquid crystal display) module, a DLP (digital light processing) module or the like according to a device type of a display means. In particular, the DLP module is operated by a mechanism for enabling the light generated from the light source to reflect on a DMD (digital micromirror device) chip and can be advantageous for downsizing the projector module 155.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, and the like. A recent use history or a cumulative use frequency of each data (e.g., use frequency for each phonebook, each message or each multimedia) can also be stored in the memory 160. Moreover, data for various patterns of vibration and/or sound output in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, and the like), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with power and transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a User Identify Module (UIM), a Subscriber Identify Module (SIM), a Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with power from the cradle or a passage for delivering various command signals input via the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, and the like. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input received on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2A:
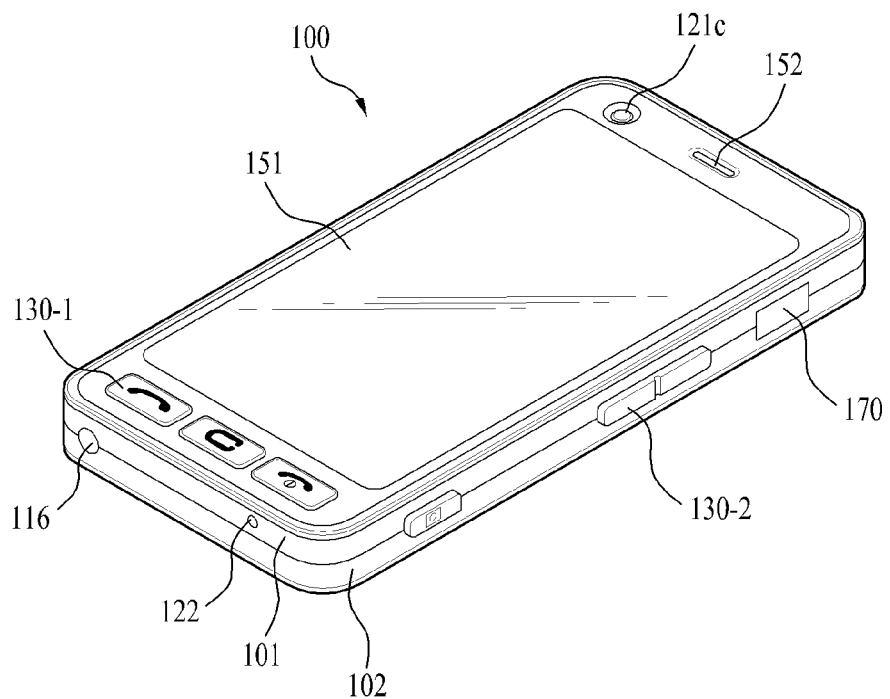
FIG. 2A is a front perspective diagram of a mobile terminal according to one embodiment of the present invention.
Figure 2B:
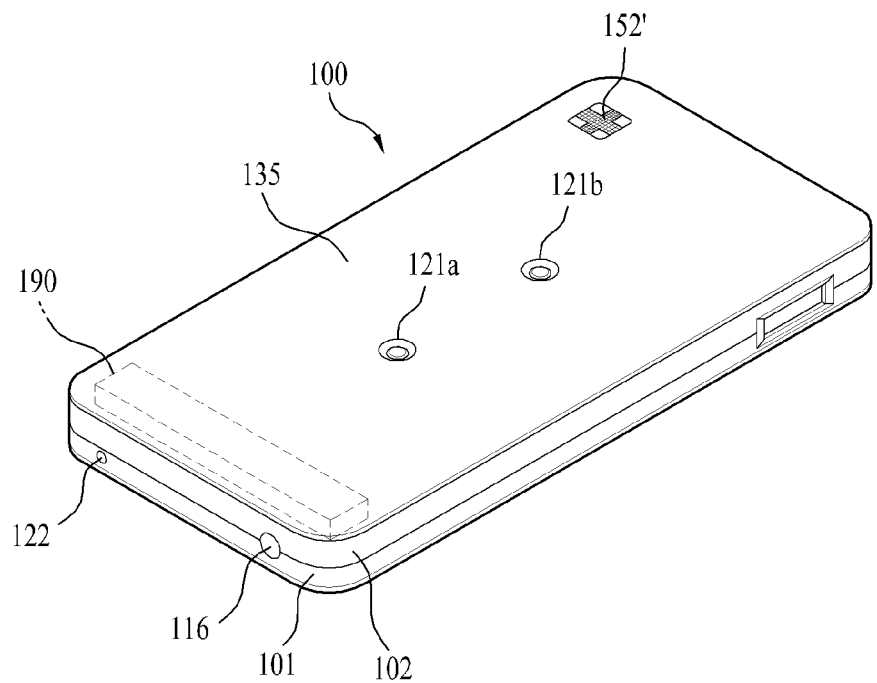
FIG. 2B is a rear perspective diagram of a mobile terminal according to one embodiment of the present invention.

FIG. 2A is a front perspective diagram of a mobile terminal according to one embodiment of the present invention. In FIGS. 2A and 2B, the mobile terminal 100 is shown to have a bar type terminal body. Yet, the mobile terminal 100 of the present application may be implemented in a variety of different configurations. Examples of such configurations include a folder-type, a slide-type, a rotational-type, a swing-type and combinations thereof. For clarity, further disclosure will primarily relate to a bar-type mobile terminal 100. However, such teachings apply equally to other types of mobile terminals.

Referring to FIG. 2A, the mobile terminal 100 includes a case (casing, housing, cover, and the like) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102. The front and rear cases 101 and 102 are formed by injection molding of synthetic resin or can be formed of a metal substance such as stainless steel (STS), titanium (Ti) or the like, for example.

A display 151, an audio output module 152, a front camera 121c, user input units 130 including a first and a second manipulating unit, 130-1 and 130-2, a microphone 122, an interface unit 170 and the like can be provided to the terminal body, and more particularly, to the front case 101.

The display 151 occupies most of a main face of the front case 101. The audio output module 151 and the front camera 121c are provided to an area adjacent to an end portion of the display 151, while the first manipulating unit 130-1 and the microphone 122 are provided to an area adjacent to another end portion of the display 151. The second manipulating unit 130-2 and the interface unit 170 can be provided to lateral sides of the front and rear cases 101 and 102.

The input unit 130 is manipulated to receive a command for controlling an operation of the mobile terminal 100. According to an embodiment of the present invention, the input unit 130 includes a plurality of manipulating units 130-1 and 130-2. The manipulating units 130-1 and 130-2 may be referred to as a manipulating portion and may adopt any mechanism of a tactile manner that enables a user to perform a manipulation action by experiencing a tactile feeling.

Content input by the first or second manipulating units 130-1 or 130-2 can be diversely set. For instance, a command such as start, end, scroll and the like, is received via the first manipulating unit 130-1. And, a command for a volume adjustment of sound output from the audio output module 152, a command for switching to a touch recognition mode of the display 151 or the like can be received via the second manipulating unit 130-2.

FIG. 2B is a perspective diagram of a backside of the mobile terminal 100 shown in FIG. 2A. Referring to FIG. 2B, a first camera 121a and a second camera 121b for 3D image photography can be additionally provided to the backside of the terminal body, and more particularly, to the rear case 102.

In particular, the first and second cameras 121a and 121b are arranged on a straight line within a range not to exceed a user's eye distance (e.g., 6.0~6.5 cm). In this case, the first and second cameras 121a and 121b enable normal 2D image photography as well as the 3D image function. Moreover, a mirror and flash can be further provided around the first and second cameras 121a and 121b.

The flash may project light toward a subject when photographing a subject using the first and second cameras 121a and 121b. In case that a user attempts to take a picture of himself (self-photography) using the first and second cameras 121a and 121b, the mirror enables the user to view his face reflected by the mirror.

Each of the first and second cameras 121a and 121b has a photographing direction substantially opposite that of the third camera 121c, and may have a resolution identical to, or different from, that of the third camera 121c.

For instance, the third camera 121c may have a lower resolution that is sufficient to photograph and transmit a picture of a user's face for a video call and the like efficiently, while each of the first and second cameras 121a and 121b has a higher resolution for photographing a general subject when transmitting the photographed subject instantly is not a necessity.

An additional audio output module 152' can be provided to the backside of the terminal body. The additional audio output module 152' may facilitate a stereo function together with the former audio output module 152 shown in FIG. 2A and may be used for implementing a speakerphone mode.

A power supply unit 190 for supplying power to the mobile terminal 100 is provided to the terminal body. The power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured as a light transmissive type like the display 151. In this case, if the display 151 is configured to output visual information from both of its opposite faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided behind the display 151 in parallel. The touchpad 135 can have a size equal to or smaller than that of the display 151.

In the following description, a method of controlling a 3D image in a mobile terminal applicable to embodiments of the present invention is explained. Stereoscopic images implemented on the display 151 of the mobile terminal 100 according to the present invention can be primarily classified into two categories. The classification of categories is based on whether different images are provided to both eyes of a mobile terminal user.

The first stereoscopic image category is a monoscopic scheme for providing the same image to both eyes of the user and is advantageous in that it can be implemented with a general display 151. In particular, the controller 180 arranges a polyhedron generated by combining at least one of dots, lines, surfaces or a combination thereof in a virtual 3D space and enables an image, which is generated from seeing the polyhedron in a specific view, to be displayed on the display 151. Therefore, such a 3D image can substantially include a planar image (2D image).

The second category is a stereoscopic scheme for providing a different image to each of both eyes of the user and relies on the principle that a user can sense a stereoscopic effect when looking at an object through its eyes. In particular, human eyes are configured to see different planar images when looking at the same object due to a distance between left and right eyes. These different images are forwarded to a human brain via retinas. The human brain is able to sense depth and reality of a 3D image by combining the different images together. Therefore, binocular disparity attributed to the distance between the eyes enables the user to sense the stereoscopic effect despite differences of the binocular disparity in each individual. Therefore, binocular disparity is an important factor for the second category.

Figure 3:
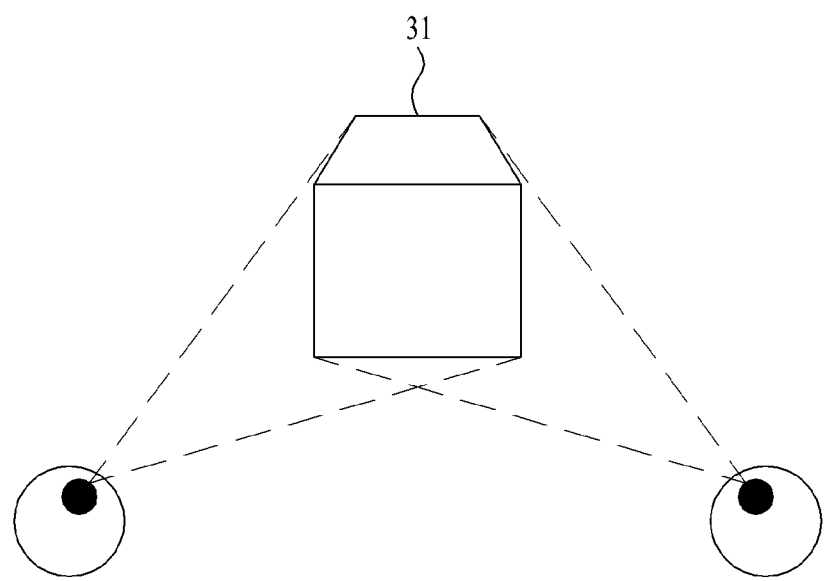
FIG. 3 is a diagram illustrating the principle of binocular disparity in accordance with the present invention.
Figure 3:
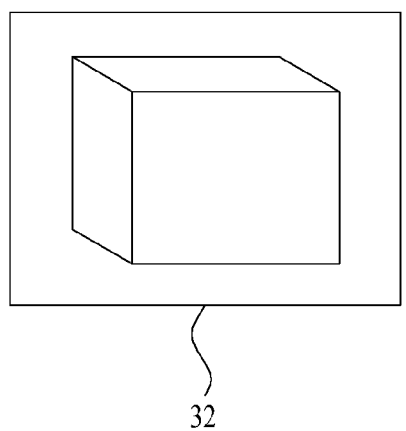
Figure 3:
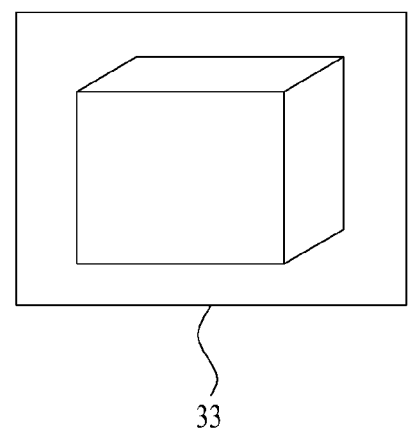

Binocular disparity is explained in detail with reference to FIG. 3 as follows. Referring to FIG. 3, when a hexahedron 31 is positioned as a subject in front of a pair of eyes at a certain height, a left eye is able to see a left eye planar image 32 revealing three facets including a top side, a front side and a left lateral side of the hexahedron 31 only. At the same time, a right eye is able to see a right eye planar image 33 revealing three facets including the top side, the front side and a right lateral side of the hexahedron 31 only.

Even if a real object is not actually positioned in front of both eyes of a user, if the left eye planar image 32 and the right eye planar image 33 are set to arrive at the left eye and the right eye, respectively, the user is able to substantially sense the hexahedron 31 as if actually looking at the hexahedron 31.

Thus, in order to implement the 3D image belonging to the second category in the mobile terminal 100, images of the same object should arrive at both eyes in a manner of being discriminated from each other for the left and right eye images of the same object with a predetermined parallax.

Figure 4:
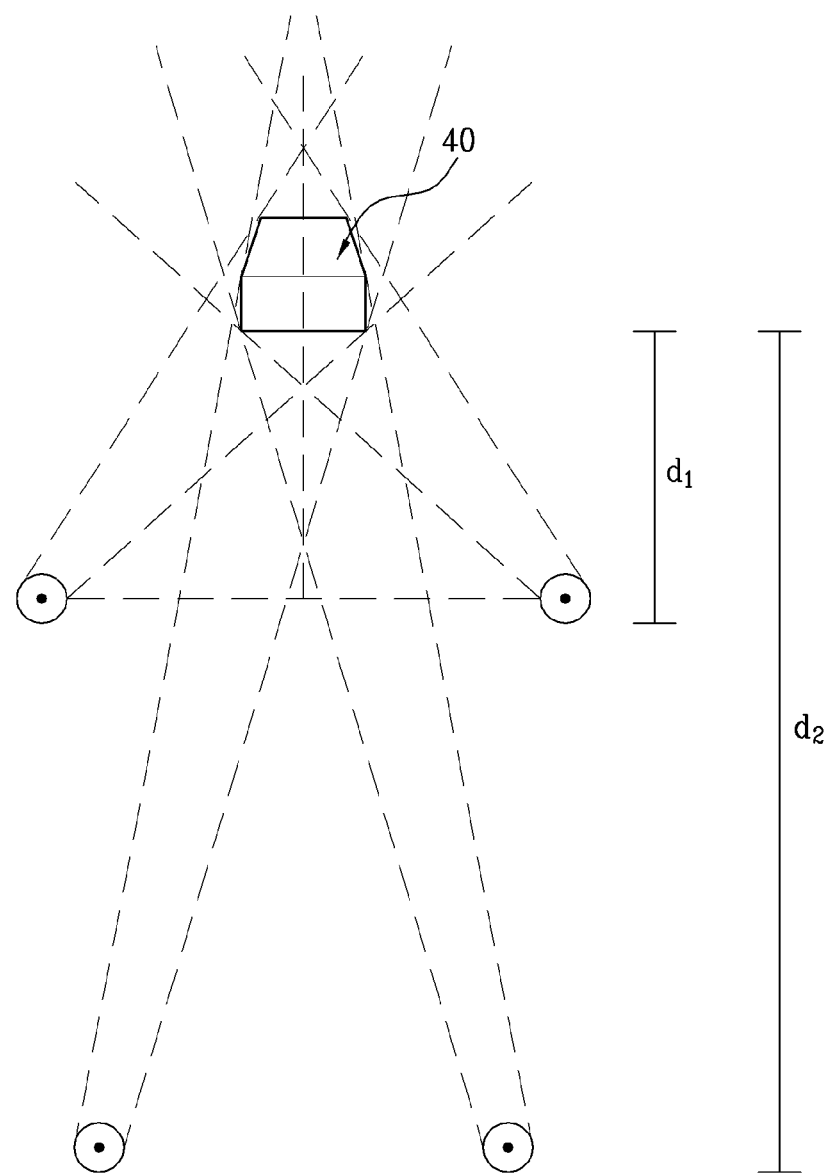
FIG. 4 is a diagram illustrating a sense of distance and 3D depth attributed to binocular disparity in accordance with the present invention.

In the following description, 3D depth attributed to the binocular disparity (parallax) is explained with reference to FIG. 4. Referring to FIG. 4, a lateral side ratio of an image entering each eye viewing a hexahedron 40 at a distance d1 through both eyes is relatively higher than that at a distance d2, whereby a difference between images seen through both eyes increases. Moreover, the extent of the stereoscopic effect sensed by a user viewing the hexahedron 40 at the distance d1 can become higher than that of viewing the hexahedron 40 at the distance d2. In particular, when a subject is seen through both eyes of the user, a closer subject provides a greater stereoscopic effect, whereas a farther subject provides a less stereoscopic effect. Such a difference in stereoscopic effects can be digitized into 3D depth or a 3D level.

A method of implementing a 3D stereoscopic image is described as follows. As mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

A parallax barrier scheme enables different images to arrive at both eyes in a manner of controlling a propagating direction of light by electronically driving a cutoff device provided between a general display and both eyes. This is explained with reference to FIGS. 5(a) and 5(b) as follows.

Figure 5:
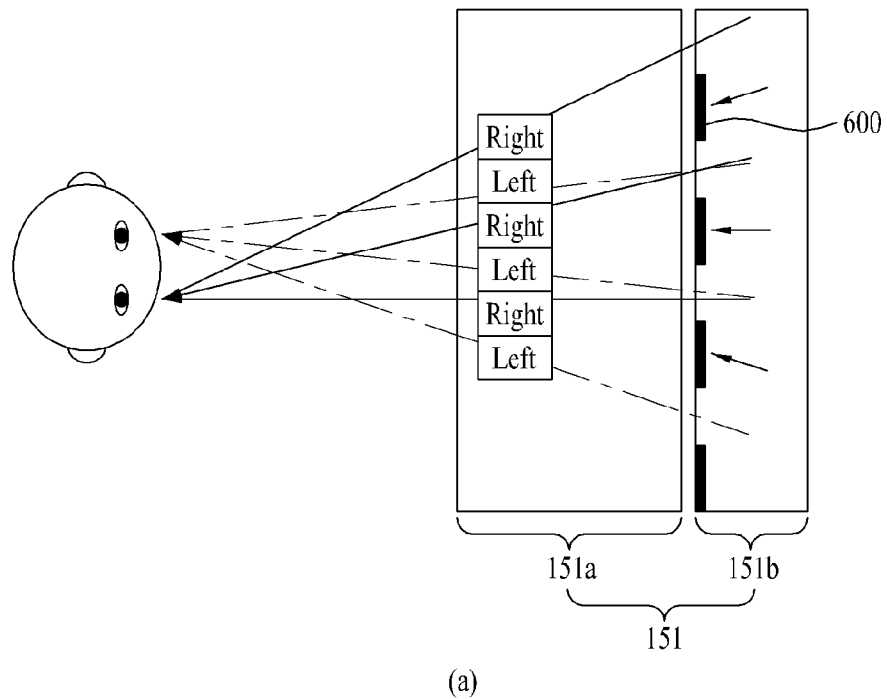
FIGS. 5(a) and 5(b) are diagrams illustrating a scheme of implementing a 3D stereoscopic image in a display unit of a parallax barrier type applicable to embodiments of the present invention.
Figure 5:
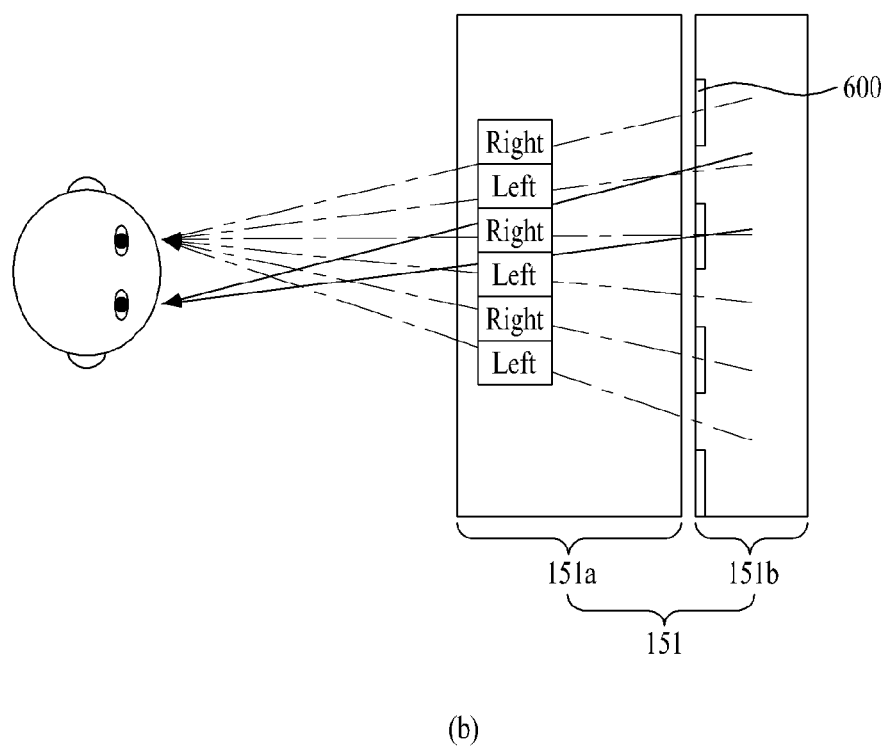

Referring to FIGS. 5(a) and 5(b), a structure of a parallax barrier type display 151 for displaying a 3D image can be configured in a manner that a general display device 151a is combined with a switch LC (liquid crystals) 151b. A propagating direction of light is controlled by activating an optical parallax barrier 600, as shown in FIG. 5(a), using the switch LC 151b, whereby the light is separated into two separate lights to arrive at the left and right eyes, respectively. Thus, when an image generated by combining an image for the right eye and an image for the left eye together is displayed on the display device 151a, a user sees the images corresponding to the respective eyes, thereby experiencing the 3D or stereoscopic effect.

Alternatively, referring to FIG. 5(b), the parallax barrier 600 attributed to the switch LC is electrically controlled to enable all light to be transmitted therethrough, whereby the light separation due to the optical parallax barrier 600 is avoided. Therefore, the same image can be seen through left and right eyes. In this case, a conventional display function is achieved.

In particular, FIGS. 5(a) and 5(b) exemplarily show that the optical parallax barrier 600 performs parallel translation in one axial direction, by which the present invention is non-limited. Alternatively, the present invention may use a parallax barrier that enables parallel translation in at least two axial directions according to a control signal from the controller 180.

2) Lenticular

A lenticular scheme relates to a method of using a lenticular screen provided between a display 151 and both eyes. In particular, a propagating direction of light is refracted via lens on the lenticular screen, whereby different images arrive at left and right eyes.

3) Polarized Glasses

According to a polarized glasses scheme, polarizing directions are set orthogonal to each other to provide different images to both eyes, respectively. In case of circular polarization, polarization is performed to have a different rotational direction, whereby different images can be provided to the left and right eyes.

4) Active Shutter

An active shutter scheme is similar to the polarized glasses scheme. In particular, a right eye image and a left eye image are alternately displayed on a display 151 with prescribed periodicity. A user's glasses enable an opposite shutter to close when an image of a corresponding direction is displayed. Therefore, the image of the corresponding direction can arrive at the eye in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, it is assumed that a mobile terminal according to one embodiment of the present invention is able to provide a user with a 3D stereoscopic image via the display 151 by one of the above described methods. Since the 3D image principle described with reference to FIG. 4 and FIGS. 5(a) and 5(b) assumes a stereoscopic object, the object in a left eye image differs from the object in a right eye image in shape.

Yet, if an object is not a stereoscopic object but a planar object, a shape of the object in a left eye image is identical to that of the object in a right eye image. If a position of the object in the left eye image is different from that of the object in the right eye image, a user is able to view the corresponding object in the perspective. To help understand the following disclosure, it may be assumed that a stereoscopic image is a planar object. However, it would be apparent to those skilled in the art that the present invention would be applicable to a stereoscopic object as well.

Figure 6:
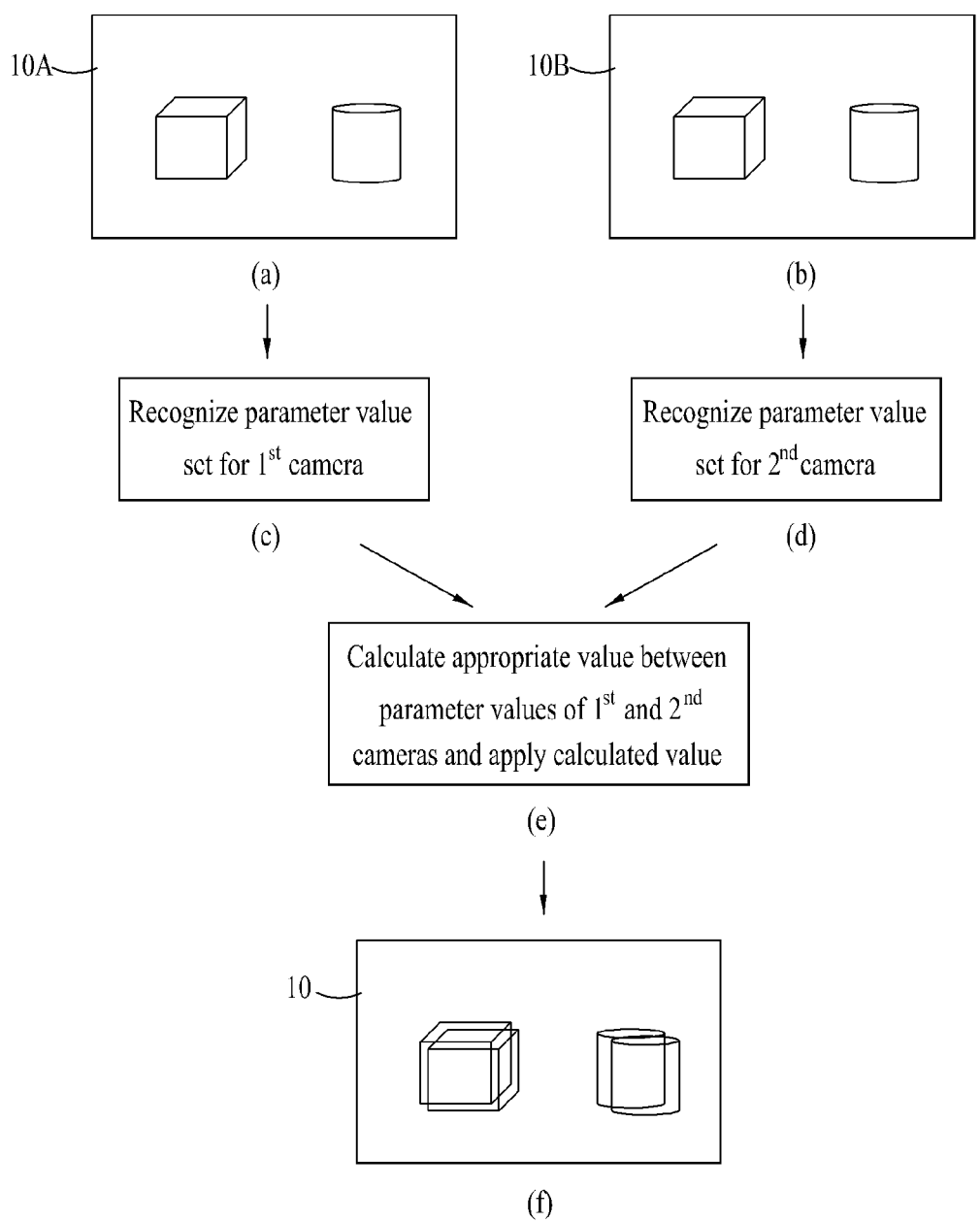
FIGS. 6(a)-6(f) are diagrams illustrating a process for generating a 3D image in a mobile terminal.

FIGS. 6(a)-6(f) are diagrams illustrating a process for generating a 3D image in a mobile terminal. FIG. 6(a) shows left and right eye images 10A and 10B input from first and second cameras provided to the mobile terminal. If the left and right eye images 10A and 10B are input, the mobile terminal recognizes respective parameter values set for the first and second cameras, as shown in FIG. 6(c) and FIG. 6(d). In this case, each of the parameter values is a value related to image quality control and includes a focus value, a white balance value, an exposure time value, a color data value and the like.

Referring to FIG. 6(e) and FIG. 6(f), the mobile terminal calculates a parameter value appropriate for a 3D image in consideration of the recognized parameter values of the first and second cameras and generates a final 3D image 10 by applying the calculated parameter value to an image generated by combining the left and right eye images 10A and 10B together.

However, because the calculating steps shown in FIG. 6(c) and FIG. 6(d) should be performed, the 3D image generation may be delayed. Therefore, according to the present invention, time taken to generate a 3D image can be shortened by applying the parameter value set for either the first or second camera to the 3D image only in the course of the 3D image generation.

Figure 7:
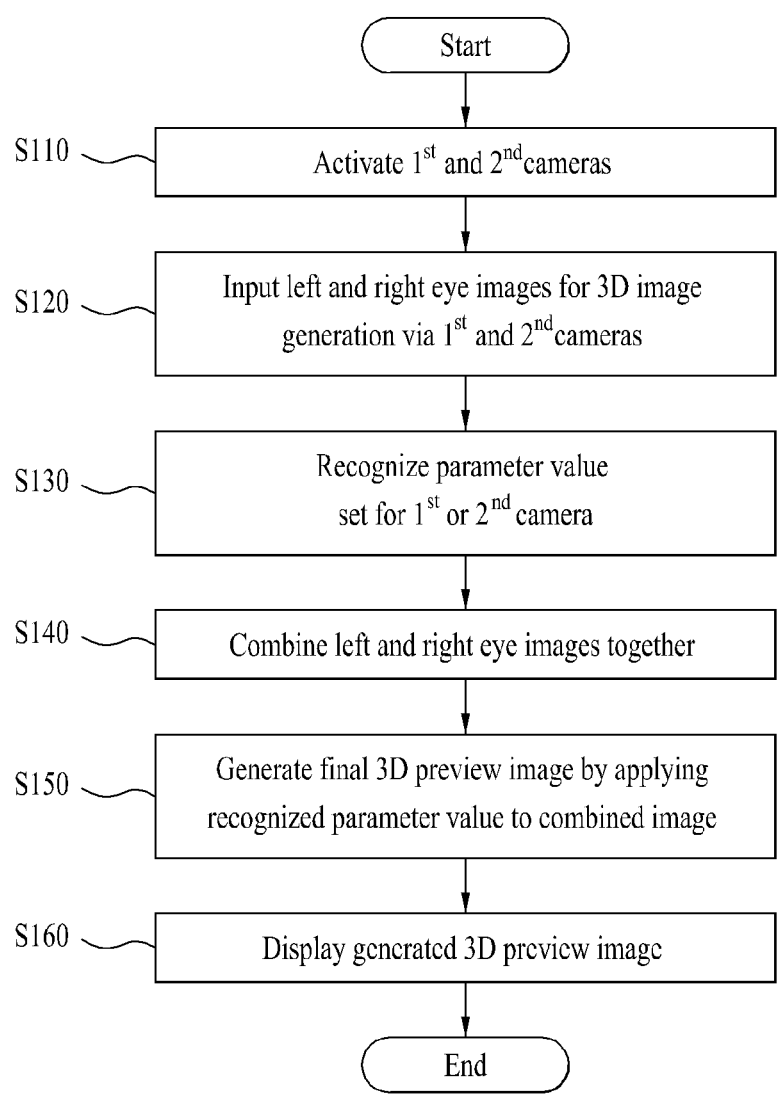
FIG. 7 is a flowchart illustrating a 3D image controlling process in a mobile terminal according to one embodiment of the present invention.
Figure 8:
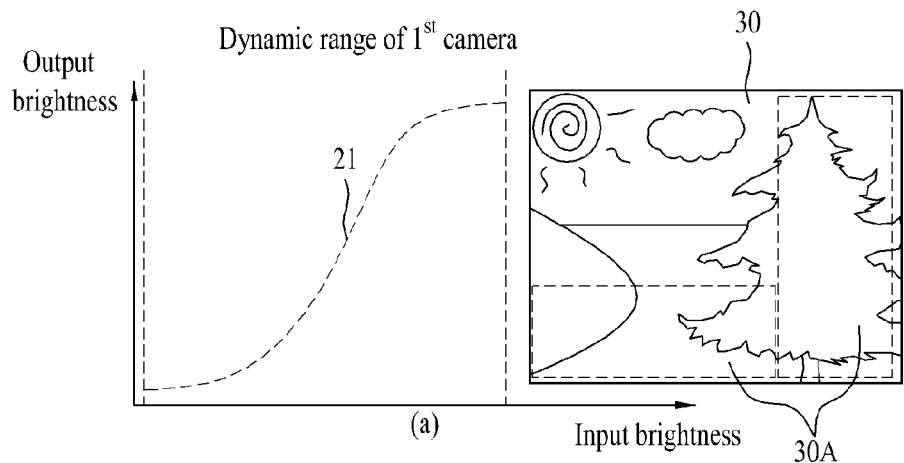
FIGS. 8(a)-8(c) are diagrams illustrating dynamic ranges set for first and second cameras according to one embodiment of the present invention.
Figure 8:
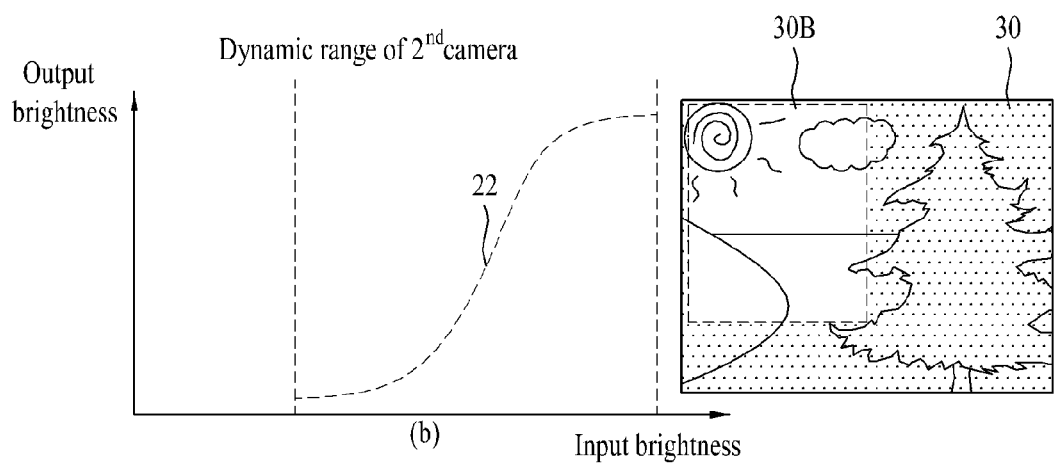
Figure 8:
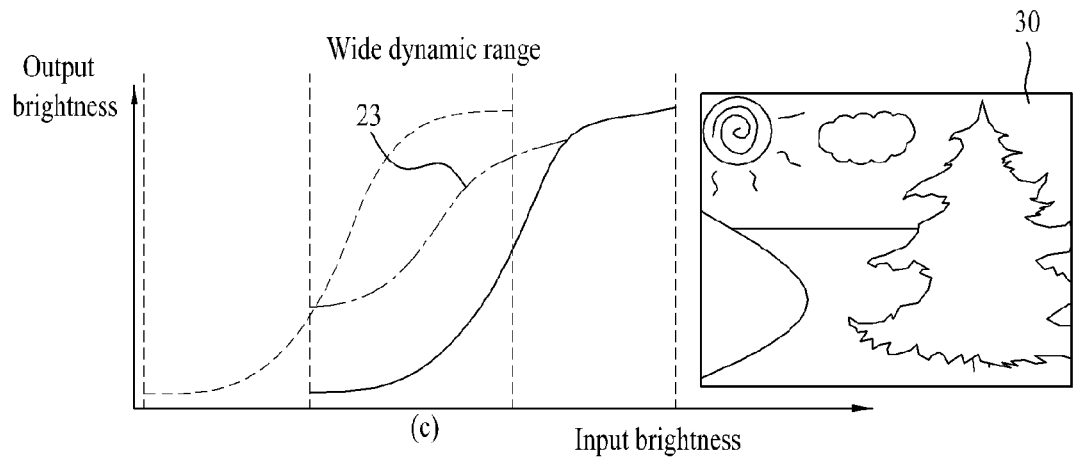
Figure 9:
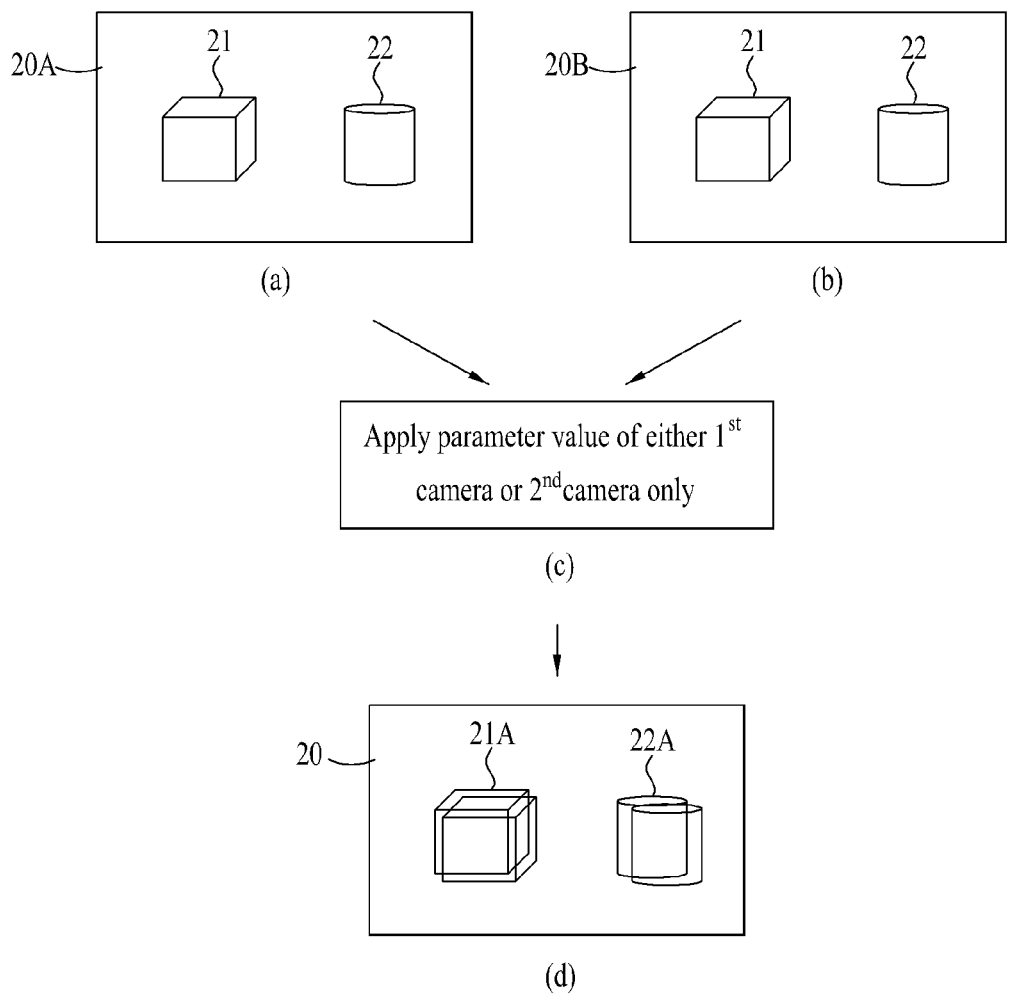
FIGS. 9(a)-9(d) are diagrams illustrating a 3D image controlling process in a mobile terminal according to another embodiment of the present invention.
Figure 10:
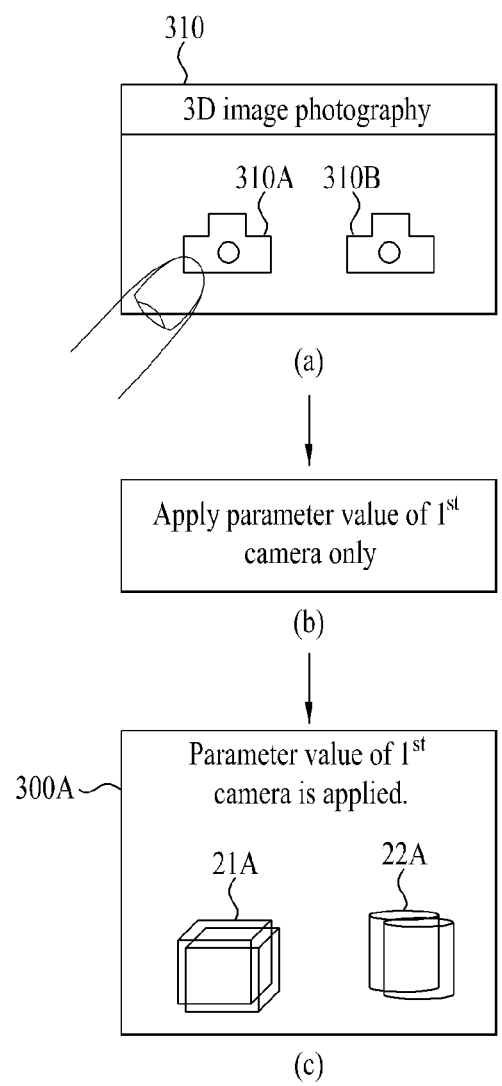
FIGS. 10(a)-10(c) are diagrams illustrating screen configurations for displaying a 3D preview image, to which a parameter value of a camera selected by a user from a first camera and a second camera is applied before generation of the 3D preview image according to one embodiment of the present invention.
Figure 11:
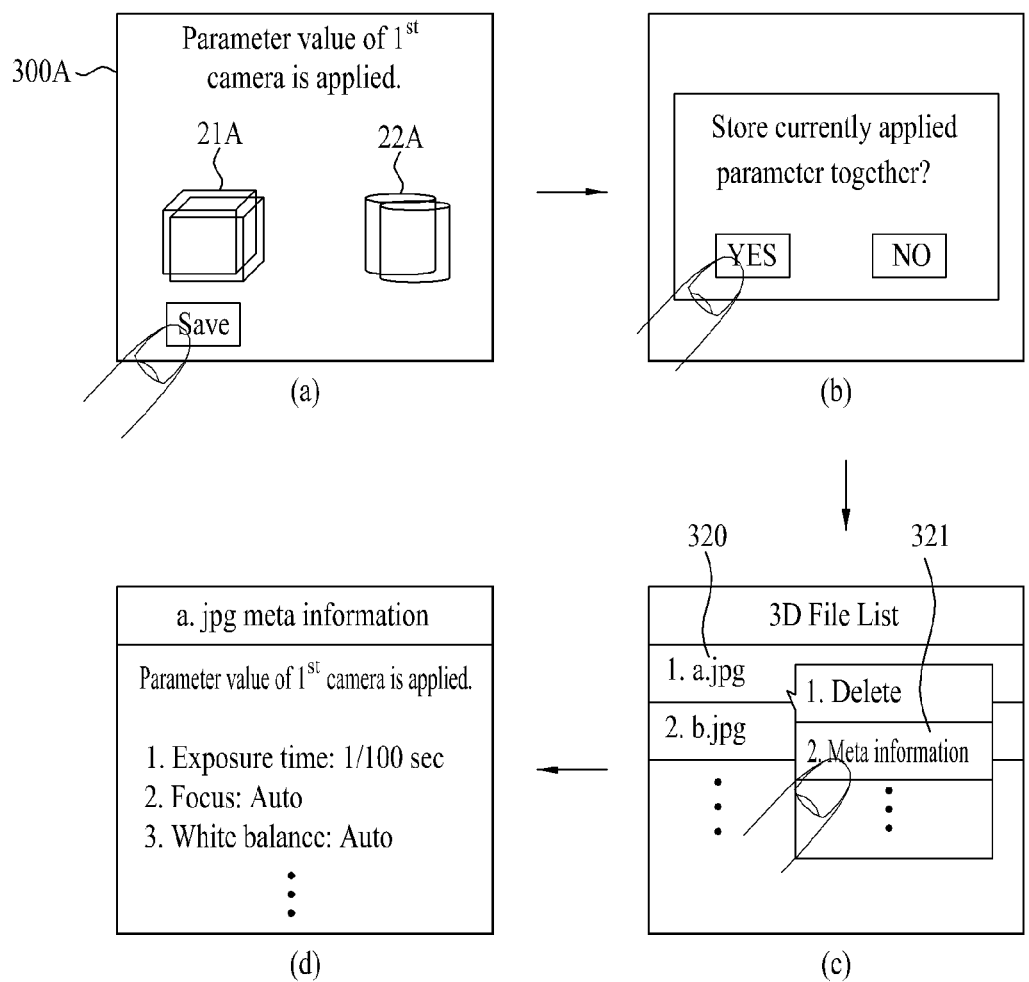
FIGS. 11(a)-11(d) are diagrams illustrating screen configurations for a process for storing a 3D preview image, to which a parameter value of a camera selected from a first camera and a second camera is applied, according to another embodiment of the present invention.

In the following description, a mobile terminal and a 3D image controlling method according to the present invention are explained in detail with reference to FIGS. 7 to 23(c). Referring to FIG. 7, if a menu for 3D photography is selected from a menu list, the controller 180 of the mobile terminal 100 activates the first camera 121a and the second camera 121b for the 3D photography [S110].

In doing so, the present invention is able to represent detailed illumination intensity in a 3D image, as shown in FIGS. 8(a)-8(c), in a manner that dynamic ranges of the first and second cameras 121a and 121b are set differently from each other. FIGS. 8(a)-8(c) show the dynamic ranges set for the first and second cameras 121a and 121b according to an embodiment of the present invention.

According to FIGS. 8(a)-8(c), in order to provide a wide dynamic range, the first and second cameras 121a and 121b are set to dynamic ranges that are different from each other. In particular, referring to FIG. 8(a), under the control of the controller 180, a first dynamic range of the first camera 121a is set to a first gamma curve 21 to represent a dark illumination intensity region 30A in detail within an image 30.

Referring to FIG. 8(b), under the control of the controller 180, a second dynamic range of the second camera 121b is set to a second gamma curve 22 to represent a bright illumination intensity region 30B in detail within the image 30. In this case, each of the first and second gamma curves 21 and 22 has the same pattern and output brightness. And, an input brightness of the second gamma curve 22 is greater than that of the first gamma curve 21.

Referring to FIG. 8(c), the controller 180 provides a wide dynamic range according to an embodiment of the present invention in a manner of overlapping a portion of the first gamma curve 21 with a portion of the second gamma curve 22. In this case, the overlapped part 23 represents a mixed illumination intensity between the first and second gamma curves 21 and 22.

As mentioned in the foregoing description with reference to FIGS. 8(a)-8(c), the first and second cameras 121a and 121b have the dynamic ranges that are different from each other. And, the dynamic ranges are set to be overlapped with each other in part. Therefore, the first and second cameras 121a and 121b are able to represent the detailed illumination intensities of the dark and bright parts.

Meanwhile, if the first and second cameras 121a and 121b are activated in S110 (FIG. 7), as mentioned in the foregoing description with reference to FIGS. 8(a)-8(c), the controller 180 controls the dynamic ranges of the first and second cameras 121a and 121b and then receives input of left and right eye images 20A and 20B, which are the source images for the 3D image generation, from the first and second cameras 121a and 121b, respectively [S120, FIG. 7] [See FIG. 9(a) and FIG. 9(b)].

Subsequently, the controller 180 recognizes the parameter value set for either the first camera 121a or the second camera 121b [S130, FIG. 7]. In this case, a prescribed one of the first and second cameras 121a and 121b is selected by a user, is randomly selected by the controller 180, or can be set as a default in the mobile terminal 100.

For purposes of explanation only, in the following description assume that the first camera 121a is selected as the prescribed one from the first and second cameras 121a and 121b, by which the present invention is not limited. Moreover, the parameter value is a value related to an image quality control and may include a focus value, a white balance value, an exposure time value, a focal distance value, an aperture value and the like.

When the controller 180 recognizes the parameter value of the first camera 121a selected from the first and second cameras 121a and 121b, the controller 180 combines the left and right eye images 20A and 20B into one image [S140, FIG. 7], generates a final 3D preview image 20 by applying the recognized parameter value to the combined image [S150, FIG. 7] [see FIG. 9(c)], and then displays the generated 3D preview image 20 on a touchscreen of the display 151 [S160, FIG. 7] [see FIG. 9(d)].

One embodiment of the present invention relates to a process for displaying a 3D preview image to which a parameter value of a camera selected from the first and second cameras 121a and 121b by a user in the process shown in FIG. 7 is applied. FIGS. 10(a)-10(c) are diagrams of screen configurations during a process for displaying a 3D preview image, to which a parameter value of a camera selected by a user from a first camera and a second camera is applied before generation of the 3D preview image.

Referring to FIGS. 10(a)-10(c), when one of the first and second cameras 121a and 121b is selected via the user input unit 130 or the touchscreen 151 before the 3D preview image is generated by the process shown in FIG. 7, the controller 180 generates the 3D preview image 300A by applying a parameter value of the selected first or second camera 121a or 121b to an image generated by combining left and right eye images together.

In particular, referring to FIG. 10(a), when a menu 310 for 3D image photography is selected by a user, the controller 180 displays first and second information 310A and 310B on the display 151, indicating the first and second cameras 121a and 121b, respectively. In this case, each of the first and second information 310A and 310B may be displayed as an icon, text, image, animation or the like that corresponds to the first or second camera 121a or 121b.

Still referring to FIG. 10(a), if the first information 310A is selected by the user, the controller 180 activates the first and second cameras 121a and 121b, and combines left and right eye images received from the first and second cameras 121a and 121b, respectively, into a single image. Further, referring to FIG. 10(b) and FIG. 10(c), the controller 180 recognizes a parameter value of the first camera 121a corresponding to the selected first information 310A and generates a 3D preview image 300A in a manner of applying the recognized parameter value of the first camera 121a to the combined image.

Another embodiment of the present invention relates to a process for storing a 3D preview image to which a parameter value of either the first or second camera is applied by the process shown in FIG. 7. Referring to FIGS. 11(a)-11(d), when a command for photographing and storing the 3D preview image 300A is received from a user via the user input unit 130 or the touchscreen 151, the controller 180 controls the 3D preview image 300A to be stored as a file 320 in the memory 160.

In particular, the controller 180 controls the 3D preview image 300A and a parameter value applied to the 3D preview image 300A to be stored as separate files in the memory 160. In doing so, the 3D preview image 300A and the parameter value are stored by being linked to each other. When the stored 3D preview image 300A is executed and displayed on the display 151, the controller 180 controls both the stored 3D preview image 300A and the stored parameter value to be displayed together. Moreover, the controller 180 is able to store information, which indicates the parameter value applied to the 3D preview image 300A and the parameter value set for the first camera 121a, as meta information of the file 320.

FIG. 11(a) shows the 3D preview image 300A to which the parameter value of the first camera 121a, among the first and second cameras 121a and 121b, is applied by the process shown in FIG. 7. In this case, when the command for photographing and storing the 3D preview image 300A is received from a user via the user input unit 130 or the touchscreen 151, as shown in FIG. 11(a), the controller 180 displays a popup window, inquiring whether the parameter value of the first camera 121a applied to the 3D preview image 300A is to be stored together with the 3D preview image 300A, as shown in FIG. 11(b).

If the command for storing the parameter value is received via the popup window, as shown in FIG. 11(b), the controller 180 controls the 3D preview image 300A to be stored as a file 320. And, the controller 180 controls the parameter value of the first camera 121a to be stored as meta information of the file 320.

When a command 321 for viewing the meta information of the 3D preview image file 320 is received via the user input unit 130 or the touchscreen 151, as shown in FIG. 11(c), the controller 180 displays the meta information of the file 320 in which the parameter value of the first camera 121a is included, as shown in FIG. 11(d).

Figure 12:
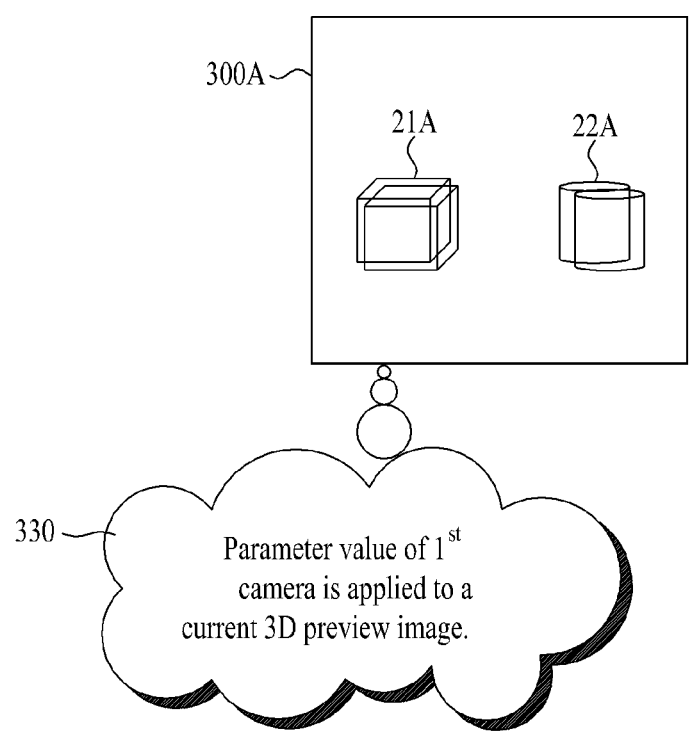
FIG. 12 is a diagram illustrating a screen configuration for a process for indicating a camera corresponding to a parameter value applied to a 3D preview image using audio according to yet another embodiment of the present invention.
Figure 13:
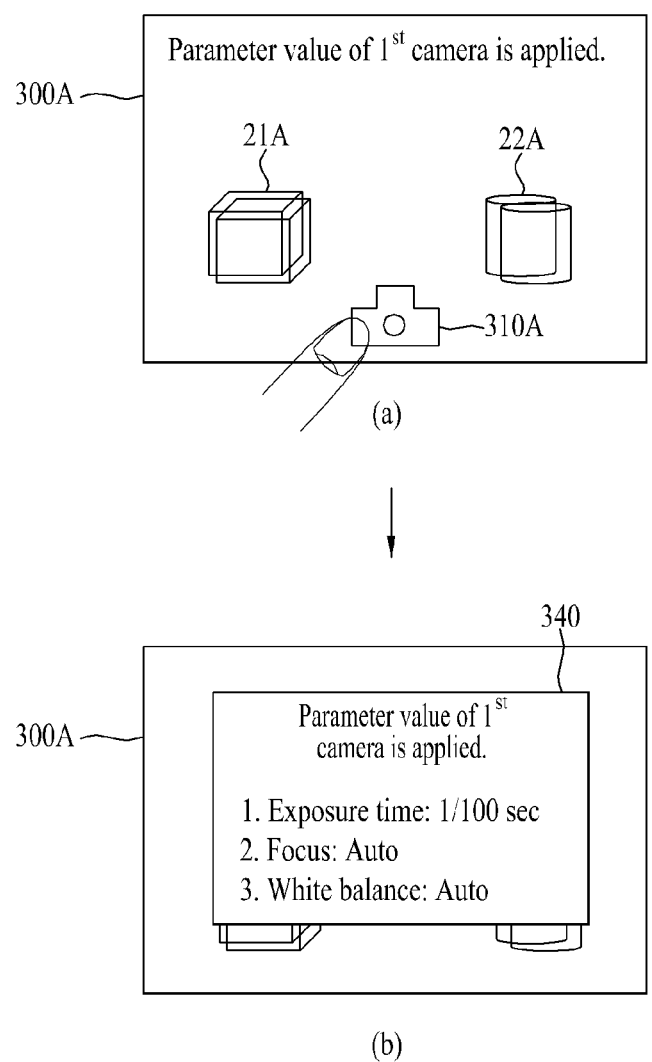
Figure 14:
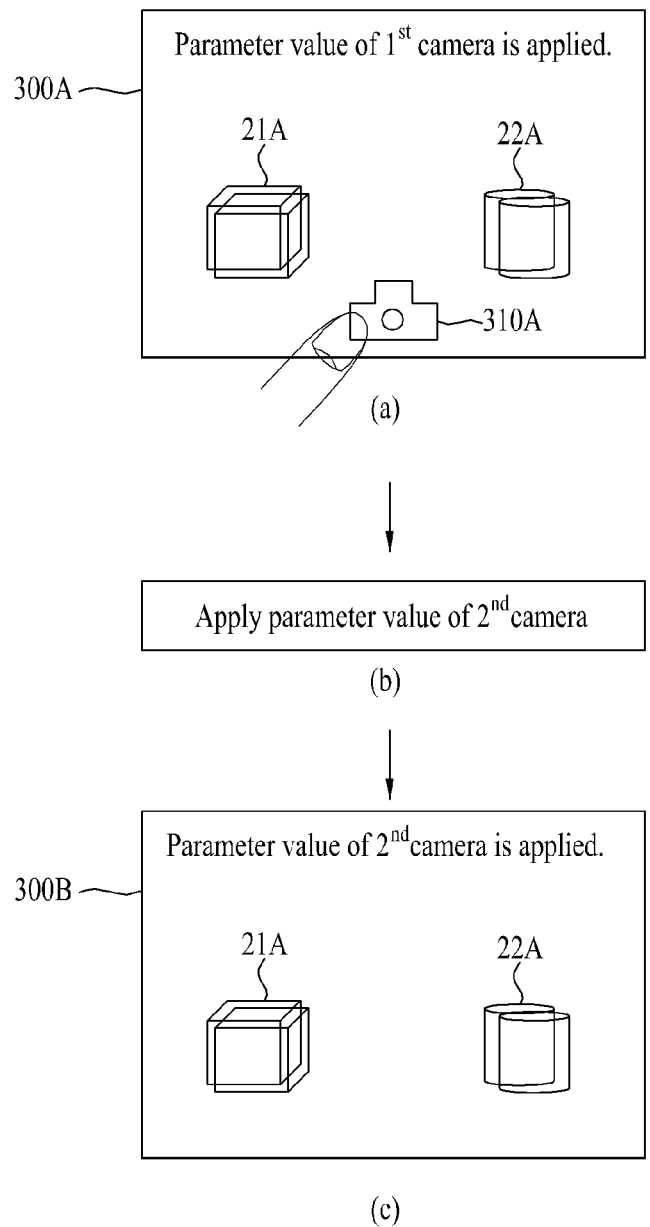
Figure 15:
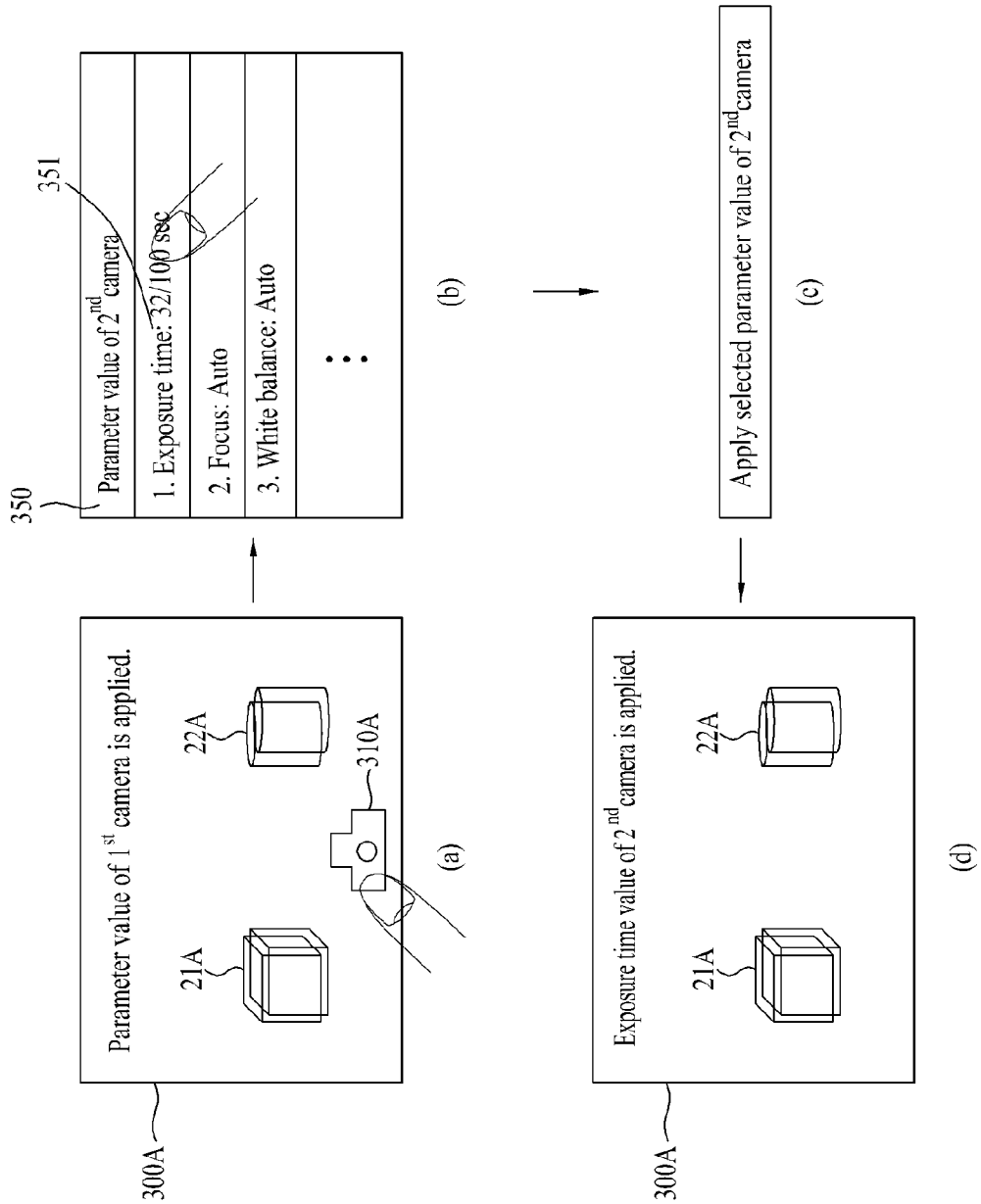
Figure 16:
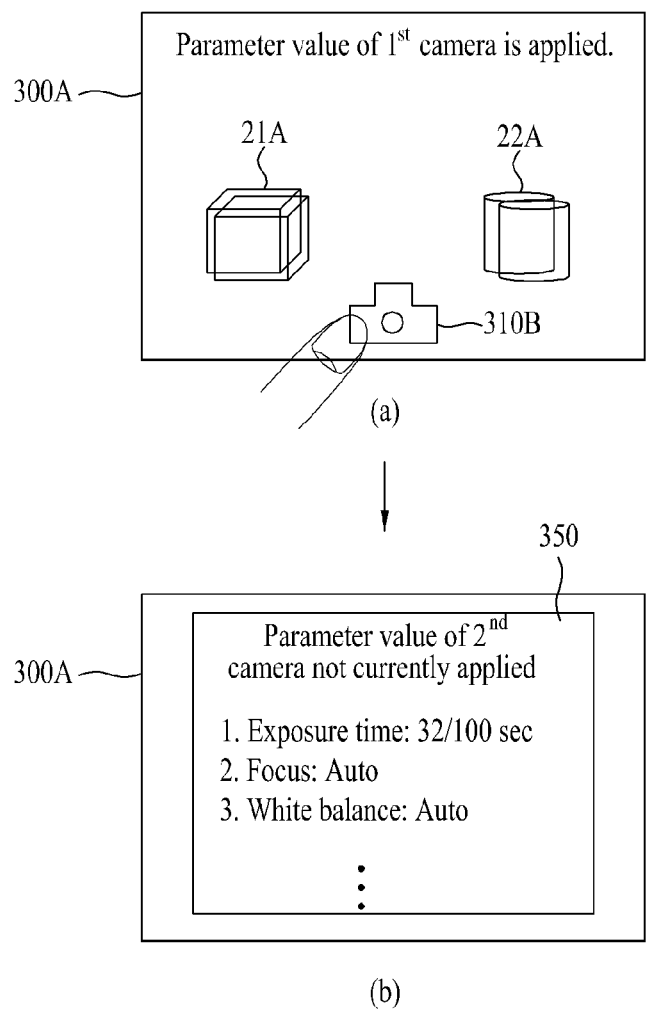
Figure 17:
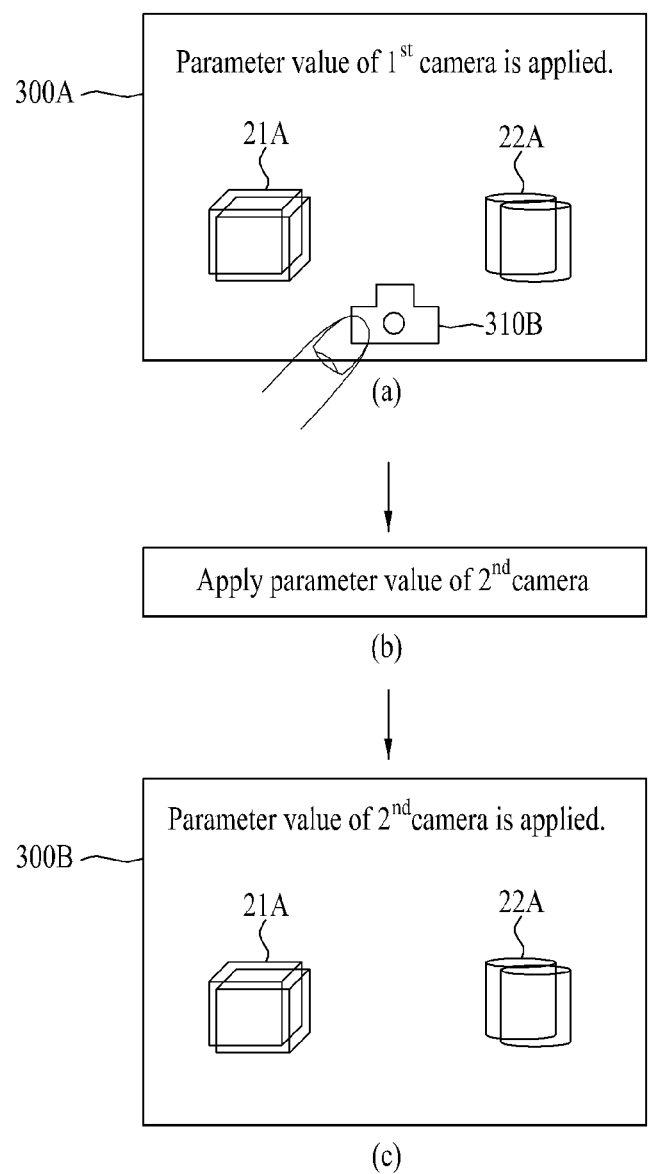
Figure 18:
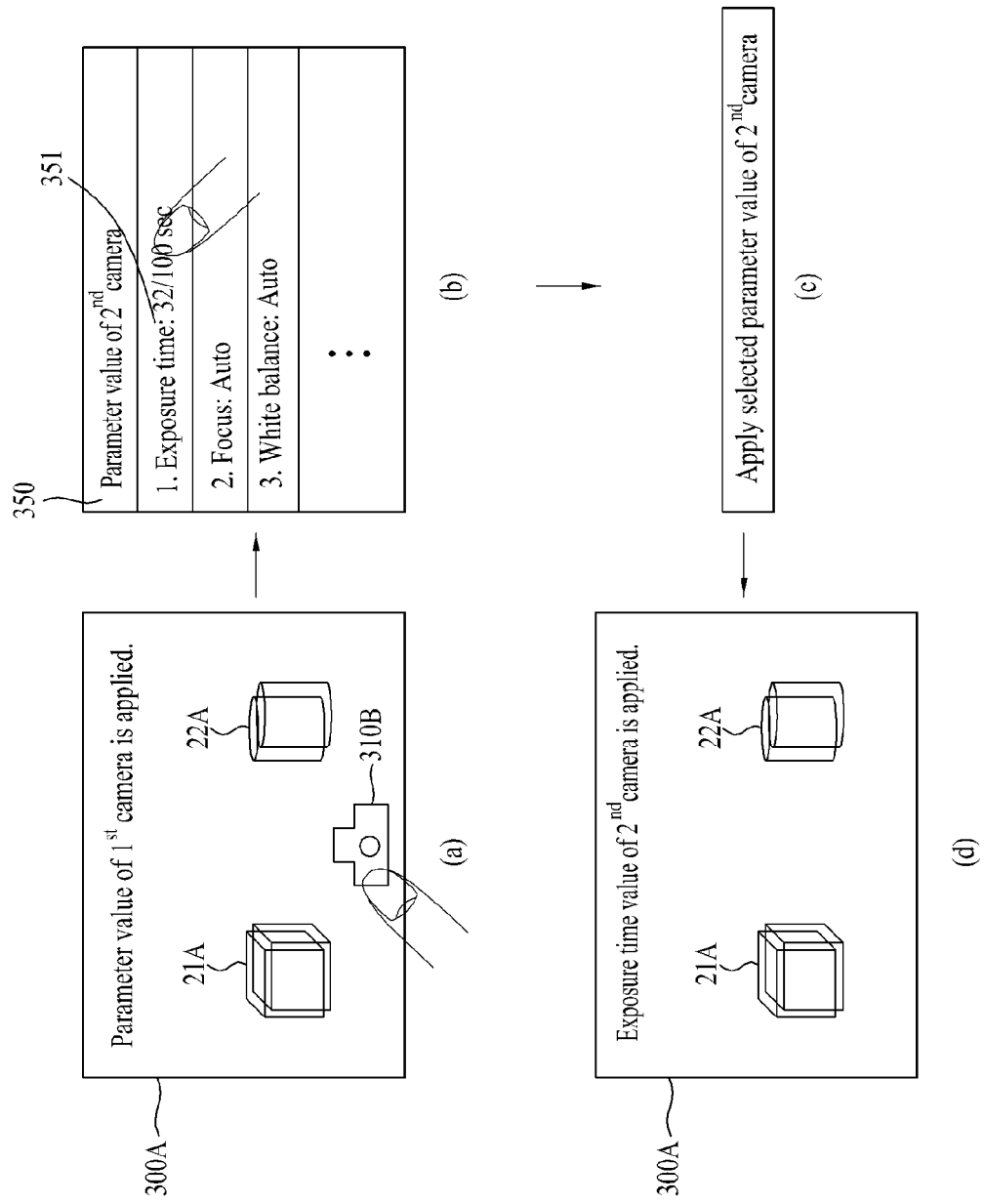
Figure 19:
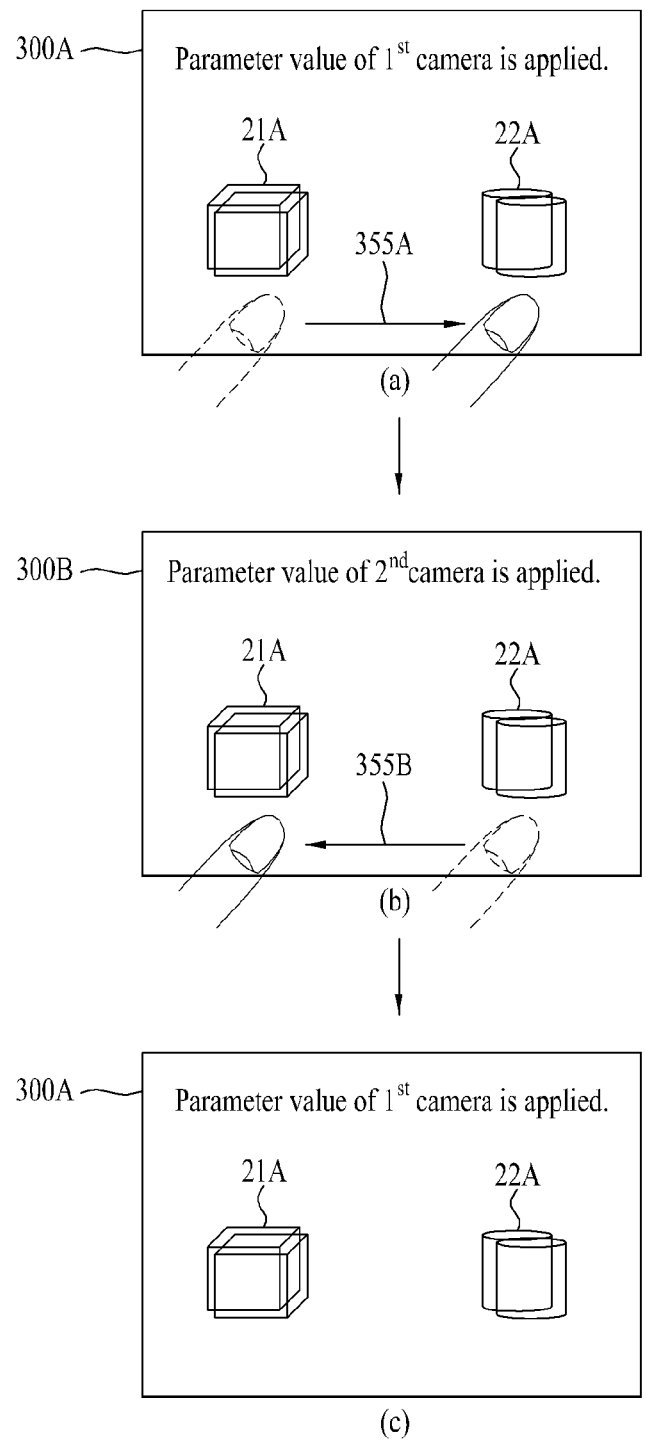
FIGS. 19(a)-19(c) are diagrams illustrating screen configurations for a process for variably applying parameter values of first and second cameras to a 3D preview image in accordance with a user's touch action according to yet still another embodiment of the present invention.
Figure 20:
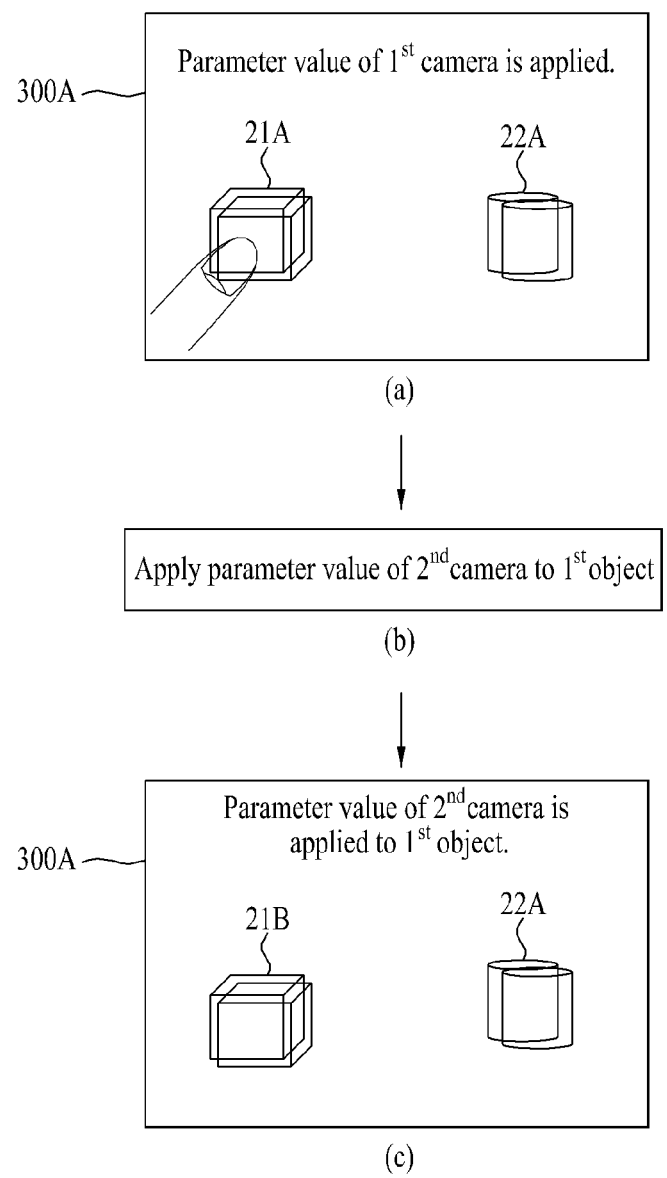
Figure 21:
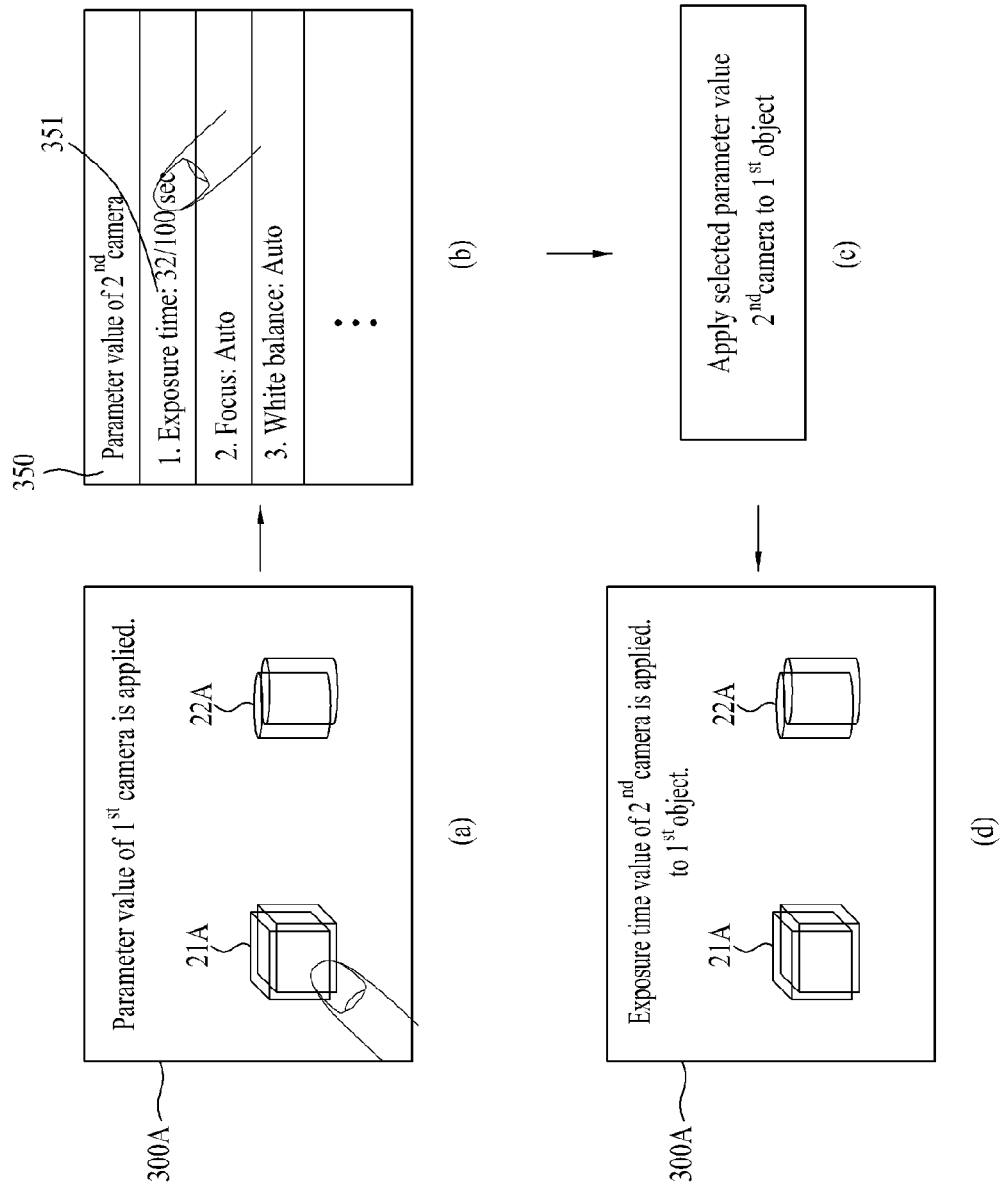
Figure 22:
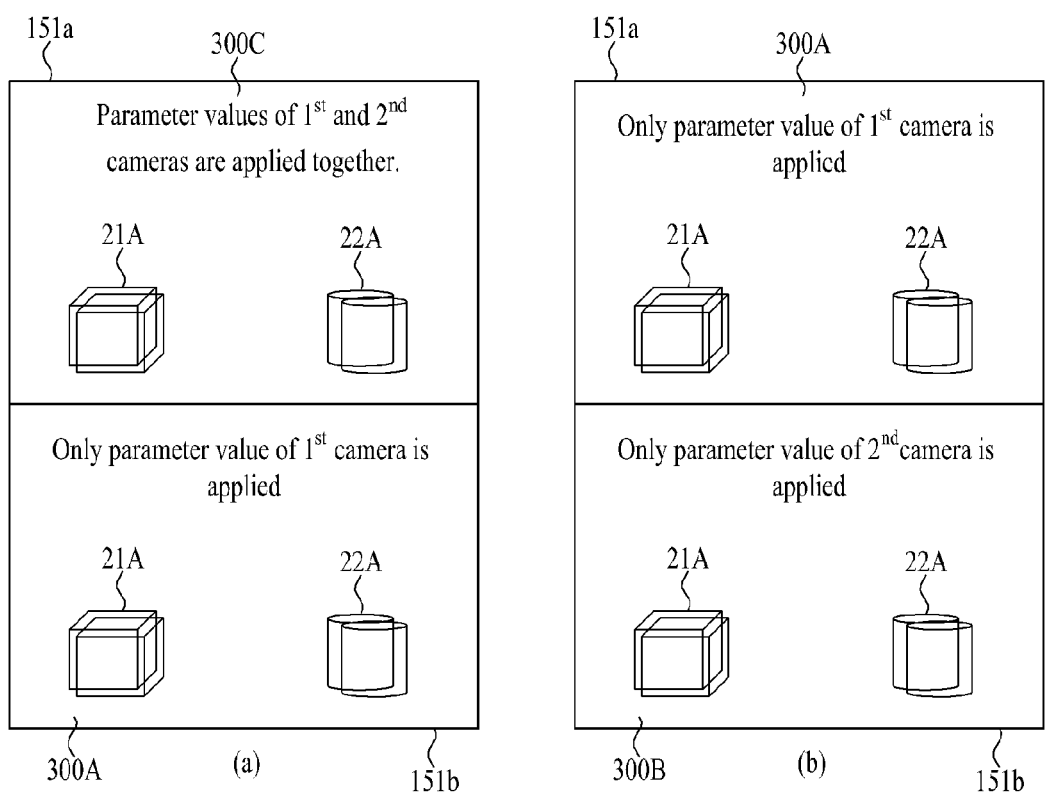
Figure 23:
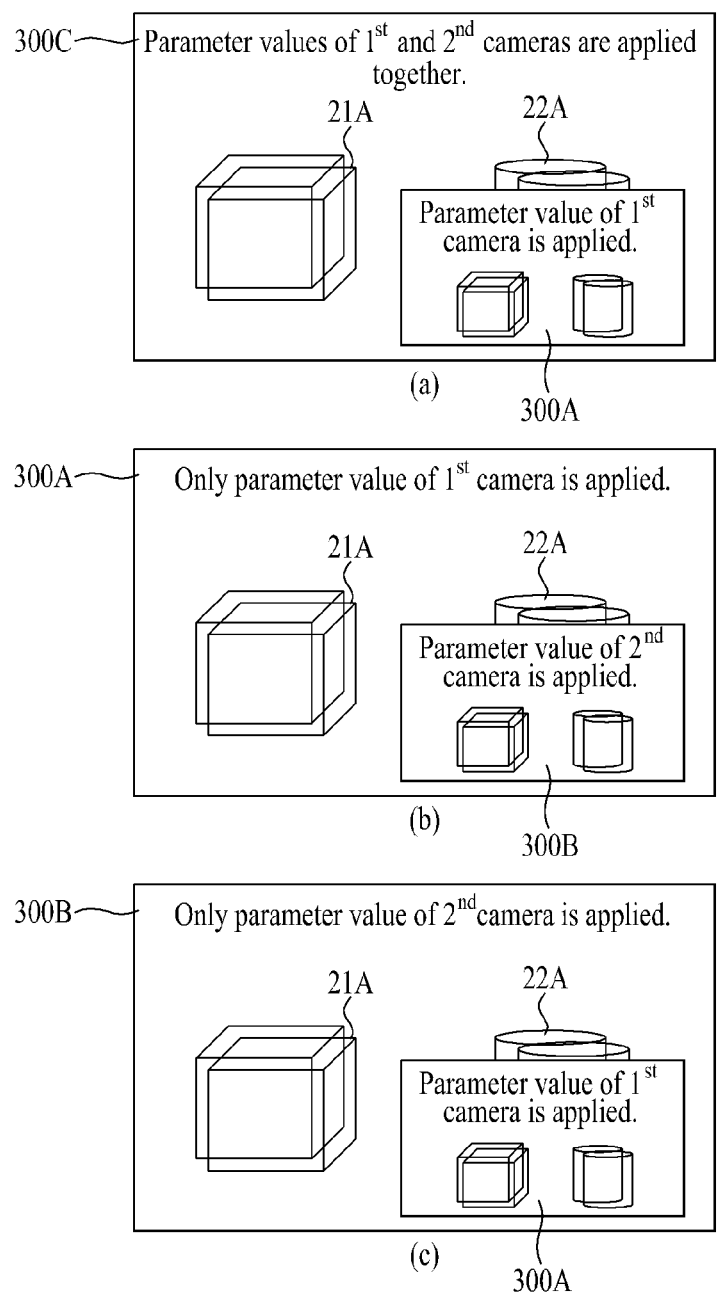

Another embodiment of the present invention relates to a process for indicating a camera having a parameter value applied to a 3D preview image using audio when the 3D preview image 300A is generated by the process shown in FIG. 7. Referring to FIG. 12, when a 3D preview image 300A, to which a camera parameter value of either the first camera 121a or the second camera 121b is applied, is generated by the process shown in FIG. 7, the controller 180 outputs audio content 330 via the audio output module 152, informing a user of the parameter value applied to the 3D preview image 300A. Thus, the user hears the audio content 330 and is then able to know whether the parameter value of the first camera 121a or the parameter value of the second camera 121b is applied to the current 3D preview image 300A. In this case, the audio content 330 may include audio data recorded by the user through the microphone 122 or audio data previously provided to the memory 160.

A further embodiment of the present invention relates to a process for indicating a camera having a parameter value applied to a 3D preview image using an image when the 3D preview image is generated by the process shown in FIG. 7. Referring to FIGS. 13(a) to 15(d), when a 3D preview image 300A, to which a camera parameter value of either the first camera 121a or the second camera 121b is applied, is generated by the process shown in FIG. 7, the controller 180 displays first identity information indicating the camera having the parameter value applied to the generated 3D preview image 300A to inform a user which one of the parameter values of the first and second cameras 121a and 121b is applied to the current 3D preview image 300A.

When the first identity information is selected by the user, the controller 180 displays detailed information of the parameter value applied to the 3D preview image 300A. Alternatively, when the first identity information is selected, the controller 180 may apply a parameter value, which is not applied to the current 3D preview image 300A among the parameter values of the first and second cameras 121a and 121b, to the current 3D preview image 300A. Alternatively, when the first identity information is selected, the controller 180 may display a list of the parameter values that have not been applied to the current 3D preview image 300A among the parameter values of the first and second cameras 121a and 121b. If at least one of the parameter values is selected from the list, the controller 180 applies the selected at least one parameter value to the current 3D preview image 300A.

Referring to FIG. 13(a), when the 3D preview image 300A having the parameter value of the first camera 121a applied thereto by the process shown in FIG. 7 is displayed on the display 151, the controller 180 controls the first identity information 310A indicating the first camera 121a to be displayed on the 3D preview image 300A.

In this case, the first identity information 310A may indicate the first camera 121a as text, an icon, an image, an animation or the like. For example, FIG. 13(a) shows that the first identity information 310A is represented as an icon having a shape of a camera.

Referring to FIG. 13(b), when the first identity information 310A is selected by a user via the user input unit 130 or the touchscreen 151, the controller 180 displays detailed information 340 of the parameter value of the first camera 121a which is applied to the 3D preview image 300A. Subsequently or alternatively, when the first identity information 310A is selected, as shown in FIG. 14(a), the controller 180 recognizes the parameter value of the second camera 121b not applied to the 3D preview image 300A and then displays the 3D preview image 300A by applying the parameter value of the second camera 121b to the 3D preview image 300A having the parameter value of the first camera 121a applied thereto, as shown in FIG. 14(b) and FIG. 14(c).

In this process, in case of attempting to apply the parameter value of the second camera 121b to the 3D preview image 300A having the parameter value of the first camera 121a applied thereto, the controller 180 deletes the parameter value of the first camera 121a from the 3D preview image 300A and then applies the parameter value of the second camera 121b to the 3D preview image 300A. Alternatively, in case of attempting to apply the parameter value of the second camera 121b to the 3D preview image 300A having the parameter value of the first camera 121a applied thereto, the controller 180 may apply the parameter value of the second camera 121b without deleting the parameter value of the first camera 121a from the 3D preview image 300A.

Moreover, when the first identity information 310A is selected, as shown in FIG. 15(a), the controller 180 recognizes the parameter value of the second camera 121b not applied to the 3D preview image 300A and then displays a list 350 of the recognized parameter values of the second camera 121b on the 3D preview image 300A, as shown in FIG. 15(b). Subsequently, when a specific parameter 351 is selected from the list 350, the controller 180 applies the selected parameter 351, for example, "1. Exposure time: $^{32}/_{100}$ sec," of the second camera 121b to the 3D preview image 300A having the parameter value of the first camera 121a applied thereto, as shown in FIG. 15(c) and FIG. 15(d).

Another embodiment of the present invention relates to a process for indicating a camera having a parameter value not applied to a 3D preview image using an image when the 3D preview image is generated by the process shown in FIG. 7. Referring to FIGS. 16(a) to 18(d), when a 3D preview image 300A, to which a camera parameter value of either the first camera 121a or the second camera 121b is applied, is generated by the process shown in FIG. 7, the controller 180 displays second identity information indicating the camera having the parameter value not applied to the generated 3D preview image 300A to inform a user which one of the parameter values of the first and second cameras 121a and 121b is not applied to the current 3D preview image 300A.

When the second identity information is selected, the controller 180 displays detailed information of the parameter value not applied to the 3D preview image 300A. Alternatively, when the second identity information is selected, the controller 180 may apply a parameter value, which is not applied to the current 3D preview image 300A among the parameter values of the first and second cameras 121a and 121b, to the current 3D preview image 300A. Alternatively, when the second identity information is selected, the controller 180 may display a list of the parameter values not applied to the current 3D preview image 300A among the parameter values of the first and second cameras 121a and 121b. When at least one of the parameter values is selected from the list, the controller 180 applies the selected parameter value to the current 3D preview image 300A.

Referring to FIG. 16(a), when the 3D preview image 300A having the parameter value of the first camera 121a applied thereto by the process shown in FIG. 7 is displayed on the display 151, the controller 180 controls the second identity information 310B indicating the second camera 121b, of which no parameter value is currently applied, to be displayed on the 3D preview image 300A. In this case, the second identity information 310B may indicate the second camera 121b as text, an icon, an image, an animation or the like. For example, FIG. 16(a) shows that the second identity information 310B is represented as an icon having a camera shape.

Referring to FIG. 16(b), when the second identity information 310B is selected by a user via the user input unit 130 or the touchscreen 151, the controller 180 displays detailed information 350 of the parameter value of the second camera 121b which is not applied to the 3D preview image 300A. Subsequently, when the second identity information 310B is selected, as shown in FIG. 17(a), the controller 180 recognizes the parameter value of the second camera 121b not applied to the 3D preview image 300A and then displays the 3D preview image 300A by applying the parameter value of the second camera 121b to the 3D preview image 300A having the parameter value of the first camera 121a applied thereto, as shown in FIG. 17(b) and FIG. 17(c).

When the second identity information 310B is selected, as shown in FIG. 18(a), the controller 180 recognizes the parameter value of the second camera 121b not applied to the 3D preview image 300A and then displays a list 350 of the recognized parameter value of the second camera 121b on the 3D preview image 300A, as shown in FIG. 18(b). Subsequently, when a specific parameter 351 is selected from the list 350, the controller 180 applies the selected specific parameter 351 of the second camera 121b to the 3D preview image 300A having the parameter value of the first camera 121a applied thereto, as shown in FIG. 18(c) and FIG. 18(d).

Another embodiment of the present invention relates to a process for variably applying parameter values of first and second cameras 121a and 121b to a 3D preview image according to a user's touch action while the 3D preview image is generated and displayed by the process shown in FIG. 7. Referring to FIG. 19(a), while a 3D preview image 300A, to which a parameter value of the first camera 121a is applied by the process shown in FIG. 7, is displayed on the display 151, a first flicking touch 355A in a specific direction (for example, from left to right), which is a command for changing the parameter value of the first camera 121a applied to the 3D preview image 300A into a parameter value of the second camera 121b, is received from a user, and the controller 180 applies the parameter value of the second camera 121b to the 3D preview image 300A having the parameter value of the first camera 121a applied thereto, as shown in FIG. 19(b).

Referring to FIG. 19(b), while the parameter value of the second camera 121b is applied to the 3D preview image 300B, a second flicking touch 355B (for example, from right to left) is received in a direction opposite to that of the first flicking touch 355A, and the controller 180 reapplies the parameter value of the first camera 121a to the 3D preview image 300B having the parameter value of the second camera 121b applied thereto, as shown in FIG. 19(c).

Another embodiment of the present invention relates to a process for applying a parameter value of a camera not applied to a 3D preview image to an object within a 3D preview image selectively while the 3D preview image is generated and displayed by the process shown in FIG. 7. Referring to FIGS. 20(a)-21(d), while a 3D preview image, to which a camera parameter value of either the first camera 121a or the second camera 121b is applied, is generated and displayed by the process shown in FIG. 7, when a specific object is selected from the 3D preview image 300A, the controller 180 applies the parameter value of the first or second camera 121a or 121b, which is not applied to the 3D preview image 300A, to the selected specific object only.

Alternatively, while a 3D preview image 300A, to which a camera parameter value of either the first camera 121a or the second camera 121b is applied, is generated and displayed on the display 151 by the process shown in FIG. 7, when a specific object is selected from the 3D preview image 300A, the controller 180 displays a list 350 of the parameter values of the first or second camera 121a or 121b that are not applied to the 3D preview image 300A. If at least one parameter is selected from the list 350, the controller 180 applies the selected at least one parameter to the selected object only.

Referring to FIG. 20(a), while the parameter value of the first camera 121a is applied to the 3D preview image 300A, when a first object 21A is selected from the 3D preview image 300A, the controller 180 recognizes the parameter value of the second camera 121b not applied to the 3D preview image 300A. Referring to FIG. 20(b) and FIG. 20(c), the controller 180 applies the recognized parameter value of the second camera 121b to the first object 21A within the 3D preview image 300A only.

Referring to FIG. 21(a), while the parameter value of the first camera 121a is applied to the 3D preview image 300A, when a first object 21A is selected from the 3D preview image 300A, the controller 180 recognizes the parameter value of the second camera 121b not applied to the 3D preview image 300A. Subsequently, referring to FIG. 21(b), the controller 180 displays a list 350 of the recognized parameter values of the second camera 121b on the 3D preview image 300A. Referring to FIG. 21(c) and FIG. 21(d), subsequently, when a specific parameter 351, for example, "1. Exposure time: $32/100$ sec," is selected from the list 350, the controller 180 applies the obtained parameter value 351 of the second camera 121b to the first object 21A within the 3D preview image 300A only.

Another embodiment of the present invention relates to a process for partitioning a screen of a touchscreen into a first region and a second region and then displaying 3D preview images having different parameter values of first and second cameras applied thereto on the first and second regions, respectively. Referring to FIG. 22(a), the controller 180 partitions a touchscreen of the display 151 into a first region 151a and a second region 151b. The controller 180 displays a 3D preview image 300C having parameter values of the first and second cameras 121a and 121b applied together on the first region 151a and displays a 3D preview image 300A, to which a parameter value of the first camera 121a is applied by the process shown in FIG. 7, on the second region 151b.

Referring to FIG. 22(b), the controller 180 partitions a touchscreen of the display 151 into a first region 151a and a second region 151b. The controller 180 displays a 3D preview image 300A, to which a parameter value of the first camera 121a is applied by the process shown in FIG. 7, on the first region 151a and displays a 3D preview image 300B, to which a parameter value of the second camera 121b is applied by the process shown in FIG. 7, on the second region 151b.

According to this embodiment, a user is able to look at various 3D preview images 300A, 300B and 300C, to which parameter values of the first and/or second cameras 121a and 121b are applied. Thus, the user is able to photograph and store a 3D preview image suitable for the user.

In other words, when either the first region 121a or the second region 121b is selected, the controller 180 controls the 3D preview image displayed on the selected region to be photographed and stored. Although a size of the first region 121a is shown to be equal to that of the second region 151b in FIGS. 22(a) and 22(b), FIGS. 23(a)-23(c) show that the second region may be displayed as a thumbnail within the first region.

Accordingly, the present invention provides the following effects and/or advantages. First of all, the present invention sets dynamic ranges of first and second cameras to differ from each other, thereby achieving more detailed intensity of illumination in a 3D image. Moreover, in case of generating a 3D image, the present invention applies a parameter value set for either a first camera or a second camera to the 3D image, thereby shortening the time taken to generate the 3D image.

It will be apparent to those skilled in the art that various modifications and variations can be specified into other forms without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal. It is intended that the present invention covers the modifications and variations of this invention provided they come within the scope of the appended claims and their equivalents.

What is claimed is:

1. A mobile terminal comprising:
   a plurality of cameras configured to capture a left eye image and a right eye image used for generating a three-dimensional (3D) image, wherein the plurality of cameras include a first camera configured to capture the left eye image and a second camera configured to capture the right eye image;
   a touchscreen configured to:
      display a first icon corresponding to the first camera and a second icon corresponding to the second camera; and
      receive a touch input via the first or second icon; and
   a controller configured to:
      activate the first and second cameras in response to the touch input such that both the first and second cameras are activated in response to the touch input received via only one of the first or second icon;
      combine the left eye image received from the activated first camera and the right eye image received from the activated second camera into a single combined image;
      recognize a parameter value set for either the first or second camera only based on the touch input;
      apply only a first parameter value set for the first camera or only a second parameter value set for the second camera to the single combined image when the parameter value is recognized;
      generate a 3D preview image based on the applied first or second parameter value;
      control the touchscreen to display the generated 3D preview image; and
      cause outputting of first information indicating which one of the first parameter value and the second parameter value has been applied to the displayed 3D preview image.

2. The mobile terminal of claim 1, wherein the parameter value comprises at least a focus value, a white balance value, an exposure value or a color data value as a value for image quality control.

3. The mobile terminal of claim 1, further comprising a memory configured to store information, wherein the controller is further configured to control the memory to store a photograph of the 3D preview image as a file in response to a command for photographing the 3D preview image.

4. The mobile terminal of claim 3, wherein the controller is further configured to control the memory such that the applied first or second parameter value and camera information corresponding to the applied first or second parameter value are recorded as meta information of the file and to store the meta information.

5. The mobile terminal of claim 3, wherein the controller is further configured to control the memory to store the 3D preview image and the applied first or second parameter value as separate files, the 3D preview image and the applied first or second parameter value linked to each other such that both the 3D preview image and the applied first or second parameter value are displayed together when the stored 3D preview image is displayed on the touchscreen.

6. The mobile terminal of claim 1, further comprising an audio output unit configured to audibly output the first information.

7. The mobile terminal of claim 1, wherein the controller is further configured to control the touchscreen to display the first information on at least a portion of the 3D preview image displayed on the touchscreen.

8. The mobile terminal of claim 7, wherein the controller is further configured to control the touchscreen to display detailed information of the first or second parameter value applied to the 3D preview image in response to an input for selecting the displayed first information.

9. The mobile terminal of claim 1, wherein the controller is further configured to:
   control the touchscreen to display second information indicating one of the first and second cameras; and
   apply at least one other parameter value of the other one of the first and second cameras to the 3D preview image, the applied at least one other parameter value not previously applied to the 3D preview image.

10. The mobile terminal of claim 1, wherein the controller is further configured control the touchscreen to display second information indicating one of the first and second cameras that corresponds to at least one other parameter value, the at least one other parameter value not previously applied to the 3D preview image.

11. The mobile terminal of claim 10, wherein the controller is further configured to apply the at least one other parameter value to the 3D preview image in response to an input for selecting the second information.

12. The mobile terminal of claim 10, wherein the controller is further configured to:
   control the touchscreen to display a list of parameter values of the other one of the first and second cameras that were not previously applied to the 3D preview image in response to an input for selecting the second information; and
   apply at least one parameter value selected from the list to the 3D preview image.

13. The mobile terminal of claim 1, wherein the controller is further configured to apply at least one other parameter value of one of the first and second cameras to the 3D preview image in response to a command for changing the parameter value applied to the 3D preview image to the at least one other parameter value, the at least one other parameter value not previously applied to the 3D preview image.

14. The mobile terminal of claim 13, wherein the command comprises a flicking touch input received in a specific direction on the touchscreen.

15. The mobile terminal of claim 1, wherein the controller is further configured to apply at least one other parameter value of one of the first and second cameras only to a selected specific object in response to an input for selecting the specific object to be photographed from the 3D preview image, the at least one other parameter value not previously applied to the 3D preview image.

16. The mobile terminal of claim 1, wherein the controller is further configured to:
   control the touchscreen to display a list of parameter values of one of the first and second cameras that were not previously applied to the 3D preview image in response to an input for selecting a specific object to be photographed from the 3D preview image; and
   apply at least one parameter value selected from the list only to the selected specific object.

17. The mobile terminal of claim 1, wherein the controller is further configured to:
   divide the touchscreen into a first region and a second region;

control the touchscreen to display a first 3D preview image on the first region, the first 3D preview image being an image to which parameter values set for both the first and second cameras are applied together; and control the touchscreen to display a second 3D preview image on the second region, the second 3D preview image being an image to which a parameter value set only for the first camera or the second camera is applied.

18. The mobile terminal of claim 17, wherein the first region has a size that substantially corresponds to a size of the entire touchscreen and the second region corresponds to a portion of the touch screen within the first region.

19. The mobile terminal of claim 1, wherein the first camera has a first dynamic range that is different from a second dynamic range of the second camera.

20. The mobile terminal of claim 19, wherein the first dynamic range and the second dynamic range are at least partially overlapped with each other.

21. The mobile terminal of claim 19, wherein the first dynamic range has a first gamma curve optimized for representing low illumination intensity and the second dynamic range has a second gamma curve optimized for representing illumination intensity that is higher than the low illumination intensity.

22. The mobile terminal of claim 21, wherein the first gamma curve and the second gamma curve are overlapped with each other in part and mixed illumination intensity between the first and second gamma curves is represented in the overlapped part.

23. A method of controlling a three-dimensional (3D) image in a mobile terminal having a first camera and a second camera, the method comprising:

displaying, on a touchscreen of the mobile terminal, a first icon corresponding to the first camera and a second icon corresponding to the second camera;

receiving a touch input via the first or second icon displayed on the touchscreen;

activating the first and second cameras in response to the touch input such that both the first and second cameras are activated in response to the touch input received via only one of the first or second icon;

receiving a left eye image via the activated first camera;

receiving a right eye image via the activated second camera;

combining the received left eye image and right eye image into a single combined image;

recognizing a parameter value set for either the first or second camera only based on the touch input;

applying only a first parameter value set for the first camera or only a second parameter value set for the second camera to the single combined image when the parameter value is recognized;

generating a 3D preview image by applying the recognized parameter value to the single combined image;

displaying the generated 3D preview image on the touchscreen; and outputting information indicating which one of the first parameter value and the second parameter value has been applied to the displayed 3D preview image.

24. The mobile terminal of claim 1, wherein both the first parameter and the second parameter value are applied to the single combined image by default if the touch input is not received, the first and second cameras being activated in response to an input that is not received via the first or second icon.

25. The mobile terminal of claim 1, wherein only one of the first parameter value and a second parameter value is applied to the single combined image by default if the touch input is not received, the first and second cameras being activated in response to an input that is not received via the first or second icon.

* * * * *